United States Patent
Kitajima

(10) Patent No.: US 9,805,443 B2
(45) Date of Patent: Oct. 31, 2017

(54) IMAGE PROCESSING METHOD, IMAGE PROCESSING APPARATUS, PROGRAM, STORAGE MEDIUM, PRODUCTION APPARATUS, AND METHOD OF PRODUCING ASSEMBLY

(71) Applicant: CANON KABUSHIKI KAISHA, Tokyo (JP)

(72) Inventor: Hiroshi Kitajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 14/793,431

(22) Filed: Jul. 7, 2015

(65) Prior Publication Data
US 2016/0012600 A1 Jan. 14, 2016

(30) Foreign Application Priority Data
Jul. 9, 2014 (JP) ................................. 2014-141277

(51) Int. Cl.
| | |
|---|---|
| G06K 9/62 | (2006.01) |
| G06T 1/60 | (2006.01) |
| G06T 1/00 | (2006.01) |
| G06T 1/20 | (2006.01) |
| G06K 9/68 | (2006.01) |
| G06T 7/73 | (2017.01) |

(52) U.S. Cl.
CPC .............. *G06T 1/60* (2013.01); *G06K 9/6202* (2013.01); *G06K 9/6212* (2013.01); *G06K 9/6857* (2013.01); *G06T 1/0007* (2013.01); *G06T 1/20* (2013.01); *G06T 7/74* (2017.01); *G06T 2207/20016* (2013.01)

(58) Field of Classification Search
None
See application file for complete search history.

(56) References Cited

U.S. PATENT DOCUMENTS

| | | | |
|---|---|---|---|
| 7,027,644 B1* | 4/2006 | Kim ..................... | G06F 17/3025 382/165 |
| 2008/0166016 A1* | 7/2008 | Sibiryakov ........ | G06K 9/00228 382/103 |
| 2010/0034476 A1* | 2/2010 | Kido .................... | G06K 9/6857 382/243 |
| 2012/0106794 A1* | 5/2012 | Iwasaki ................. | G06T 7/2006 382/103 |
| 2012/0288164 A1* | 11/2012 | Nagashima ........ | G06K 9/00281 382/117 |
| 2015/0078629 A1* | 3/2015 | Gottemukkula ..... | G06K 9/0061 382/117 |

FOREIGN PATENT DOCUMENTS

JP 2002-157591 A 5/2002

* cited by examiner

*Primary Examiner* — Sumati Lefkowitz
*Assistant Examiner* — David Perlman
(74) *Attorney, Agent, or Firm* — Canon U.S.A., Inc. IP Division

(57) ABSTRACT

A tentative local score between a point in a feature image in a template image and a point, in a target object image, at a position corresponding to the point in the feature image is calculated, and a determination is performed as to whether the tentative local score is smaller than 0. In a case where the tentative local score is greater than or equal to 0, the tentative local score is employed as a local score. In a case where the tentative local score is smaller than 0, the tentative local score is multiplied by a coefficient and the result is employed as a degree of local similarity.

27 Claims, 17 Drawing Sheets

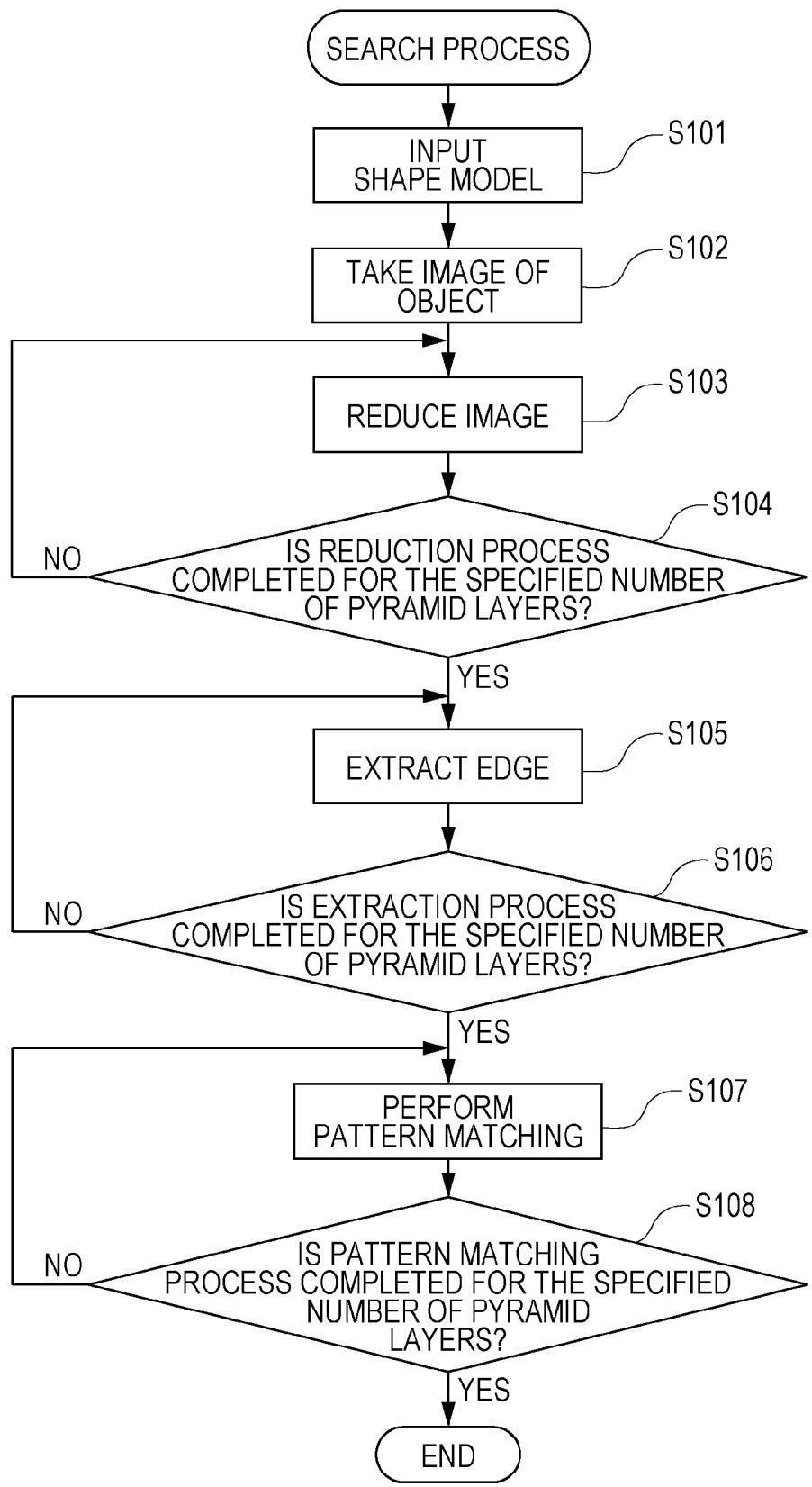

IMAGE PROCESSING METHOD, IMAGE PROCESSING APPARATUS, PROGRAM, STORAGE MEDIUM, PRODUCTION APPARATUS, AND METHOD OF PRODUCING ASSEMBLY

BACKGROUND

Field of the Disclosure

The present disclosure relates to an image processing method using pattern matching, an image processing apparatus, a program, a storage medium, a production apparatus, and a method of producing an assembly.

Description of the Related Art

In the field of image processing technology, it is well known to use pattern matching as a method of detecting a position of an object to be detected.

A conventional basic method of pattern matching is described below. To perform pattern matching, first, it is necessary to acquire reference information about an object to be detected. The reference information is generally called a model or a template. As for the reference information, a reference image is prepared by taking an image of an object in an ideal state (a reference object). An area including the object to be detected and a vicinity thereof is extracted from the reference image and is employed as a model or a template. In an actual process of detecting an object, a target object image is acquired by taking an image of an object, and a degree of similarity to the model or the template is calculated at each of various positions in the target object image. A position at which a highest degree of similarity is found is regarded as a detected position. That is, among positions in the target object image, a position at which a highest degree of similarity is obtained is searched for. However, the pattern matching needs a high calculation cost and a long processing time. Thus, to increase the processing speed, a pyramid search technique is generally used.

In the pyramid search method, an image is reduced a plurality of times in a step-by-step manner. First, pattern matching is performed on an image with a highest reduction ratio. Next, searching is performed on an image with a next highest reduction ratio but only in an area in the vicinity of the position at which the target object is detected in the previous image. By performing the search in the above-described manner repeatedly until the search is completed for an image with no reduction, it is possible to achieve an increase in the processing speed while maintaining the accuracy.

To calculate the degree of similarity described above, a plurality of methods are known. Examples include a sum of absolute difference (SAD) method, a normalized cross correlation (NCC) method, and a shape pattern matching method. Among various methods, the shape pattern matching method is robust against a change in illumination or against being partially hidden or lost, or the like. In the shape pattern matching method, the degree of similarity between a template and a target object image is calculated based on their shape features. Therefore, in the shape pattern matching method, it is necessary to extract a shape feature of an image.

To extract a shape feature, it is generally known to extract edges using a Sobel filter, a Canny filter, or the like. For each edge point obtained via the edge extraction process, information in terms of position coordinates, an intensity gradient direction, an intensity gradient magnitude, or the like is acquired. The pattern matching is performed while making a comparison between the template and the target object image in terms of the gradient direction at each edge point (hereinafter, referred to as an edge direction). If the difference in the edge direction between the template and the target object image is small at each edge point, it is determined that the template and the target object image have similar shape features and thus their degree of similarity is high. If the difference is large, the degree of similarity is low. That is, this method searches, from the target object image, for an image having edge directions similar to edge directions the template has, at edge position coordinates similar to edge position coordinates in the template.

However, there is a possibility that the detection target object has a partial change in terms of the edge direction due to adhesion of dust, dirt, or the like, a change in illumination, an object-to-object difference in surface state, or the like. In such a situation, when the edge directions are compared in the pattern matching, the resultant degree of similarity becomes extremely low, which may cause a recognition error to occur in searching the search target object.

In a method disclosed in Japanese Patent Laid-Open No. 2002-157591, to handle the above-described situation, in a case where an inversion in the edge direction by nearly 180° is found at some edge points, the degree of similarity is increased. That is, by neglecting the polarity of the edge direction in the calculation of the degree of similarity, it is possible to perform the pattern matching successfully without having a recognition error even in the above-described situation.

However, in the pattern matching method disclosed in Japanese Patent Laid-Open No. 2002-157591, the degree of similarity is increased by changing the edge direction into an opposite direction, and thus there is a tendency that the degree of similarity is increased at a position other than the target object. In the pyramid search, when reduced images in middle pyramid layers are subjected to searching, positions at which the degree of similarity (the score) is higher than a certain level are kept as matching candidate point for use in searching in a next pyramid level because there is a possibility that a recognition error occurs in searching in an image with a low resolution. In the pattern matching method disclosed in Japanese Patent Laid-Open No. 2002-157591, therefore, a large number of matching candidate points occur in searching at an initial stage or searching in middle pyramid layers, which results in an increase in processing time.

In view of the above, the present invention provides a technique of performing searching process on an image of a search target object (target object) such that the processing time is reduced while preventing a recognition error even in a situation in which an inversion of the edge direction occurs at some of points due to adhesion of dust, dirt, or the like, a change in illumination, an object-to-object difference in surface state, or the like.

SUMMARY

In an aspect, the present disclosure provides an image processing method for performing image processing by an image processing apparatus using a first pyramid including a plurality of template images having different resolutions and hierarchized in layers according to the resolutions, a second pyramid including a plurality of target object images having different resolutions from each other but equal to the respective resolutions of the template images in the first pyramid and hierarchized in layers according to the resolutions such that an image similar to a feature image included in a template image in the first pyramid is searched for from a target object image in the second pyramid by evaluating similarity between the feature image in a layer and the target object image in a corresponding layer on a layer-to-layer basis in an order of resolution from the lowest to highest, the method including calculating a degree of local similarity between a point in the feature image and a corresponding point in the target object on a point-by-point basis for each of all points in the feature image, and calculating the degree of the similarity between the feature image and the target object image by determining the sum of the calculated degrees of local similarity and normalizing the sum, the calculating the degree of local similarity including calculating a tentative degree of local similarity between a point in the feature image and a point, in the target object image, at a position corresponding to the point in the feature image, determining whether the tentative degree of local similarity is smaller than a predetermined value, in a case where the tentative degree of local similarity is determined to be greater than or equal to the predetermined value, employing the tentative degree of local similarity as the degree of local similarity, and in a case where the tentative degree of local similarity is determined to be smaller than the predetermined value, changing the tentative degree of local similarity so as to reduce the absolute value of the tentative degree of local similarity and employing the resultant tentative degree of local similarity as the degree of local similarity.

The technique disclosed herein makes it possible to perform image processing on an image of a search target object (target object) in a short processing time while minimizing a recognition error even in a situation in which an inversion of the edge direction occurs at some edge points due to adhesion of dust or dirt, a change in illumination, an object-to-object difference in surface state, or the like.

Further features of the present invention will become apparent from the following description of exemplary embodiments with reference to the attached drawings.

BRIEF DESCRIPTION OF THE DRAWINGS

FIG. 19 is a flow chart illustrating a searching process in an image processing method according to the seventh embodiment.

DESCRIPTION OF THE EMBODIMENTS

Embodiments of the present invention are described in detail below with reference to drawings.

First Embodiment

Figure 1:
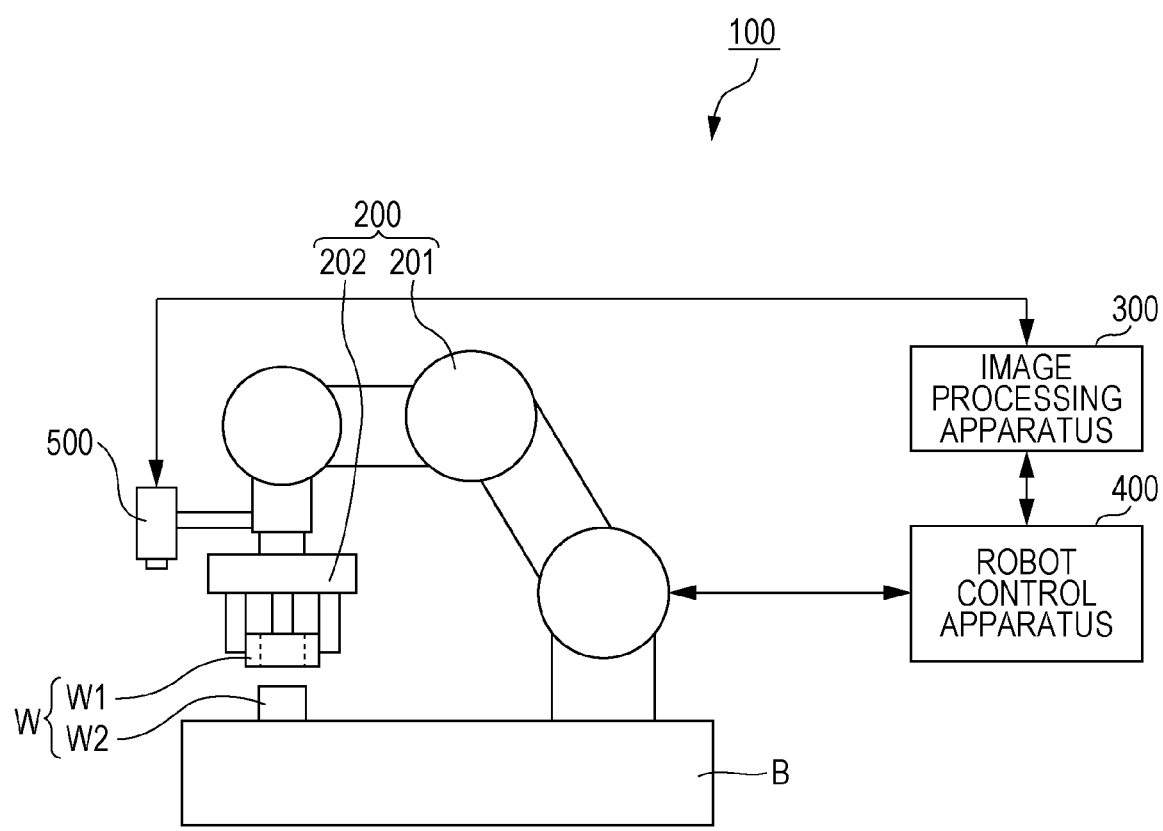
FIG. 1 is a schematic diagram illustrating in a simplified manner a structure of a production apparatus according to a first embodiment.

FIG. 1 is a diagram illustrating in a simplified manner a structure of a production apparatus according to a first embodiment. The production apparatus 100 illustrated in FIG. 1 executes a method of producing assembly W by assembling a work (target object) W1 to a work (a receiving member) W2. The production apparatus 100 includes a robot 200, a camera 500 serving as an image pickup apparatus mounted on the robot 200, and an image processing apparatus 300 configured to communicate with the camera 500 via a wired or wireless connection. The production apparatus 100 also includes a robot control apparatus 400 connected to the robot 200 and the image processing apparatus 300 via a cable or the like.

The robot 200 includes a robot arm 201 of a vertically articulated type, and a robot hand 202 which is a hand effector. The robot arm 201 includes a plurality of links rotatably or revolvably connected from one to another via a plurality of joints. A base end (also referred to as a base end link or a base part) of the robot arm 201 is fixed to an upper surface of a base stage B. A robot hand 202 is attached to a leading end (leading end link) of the robot arm 201. The robot hand 202 includes a plurality of fingers thereby being capable of holding and releasing a work (target object) W1.

The camera 500 is a digital camera having an image sensor such as a charge coupled device (CCD) image sensor, a complementary metal oxide semiconductor (CMOS) image sensor, or the like.

The image processing apparatus 300 controls an image capture operation (for example, image capture timing, a shutter speed, and/or the like) of the camera 500 and acquires a captured image from the camera 500. The image processing apparatus 300 performs image processing on an image (digital data) and outputs a result thereof to the robot control apparatus 400. More specifically, the image processing apparatus 300 performs a pattern matching process and outputs a result thereof to the robot control apparatus 400. The robot control apparatus 400 controls an operation of the robot 200 based on the result of the image processing performed by the image processing apparatus 300.

Figure 2:
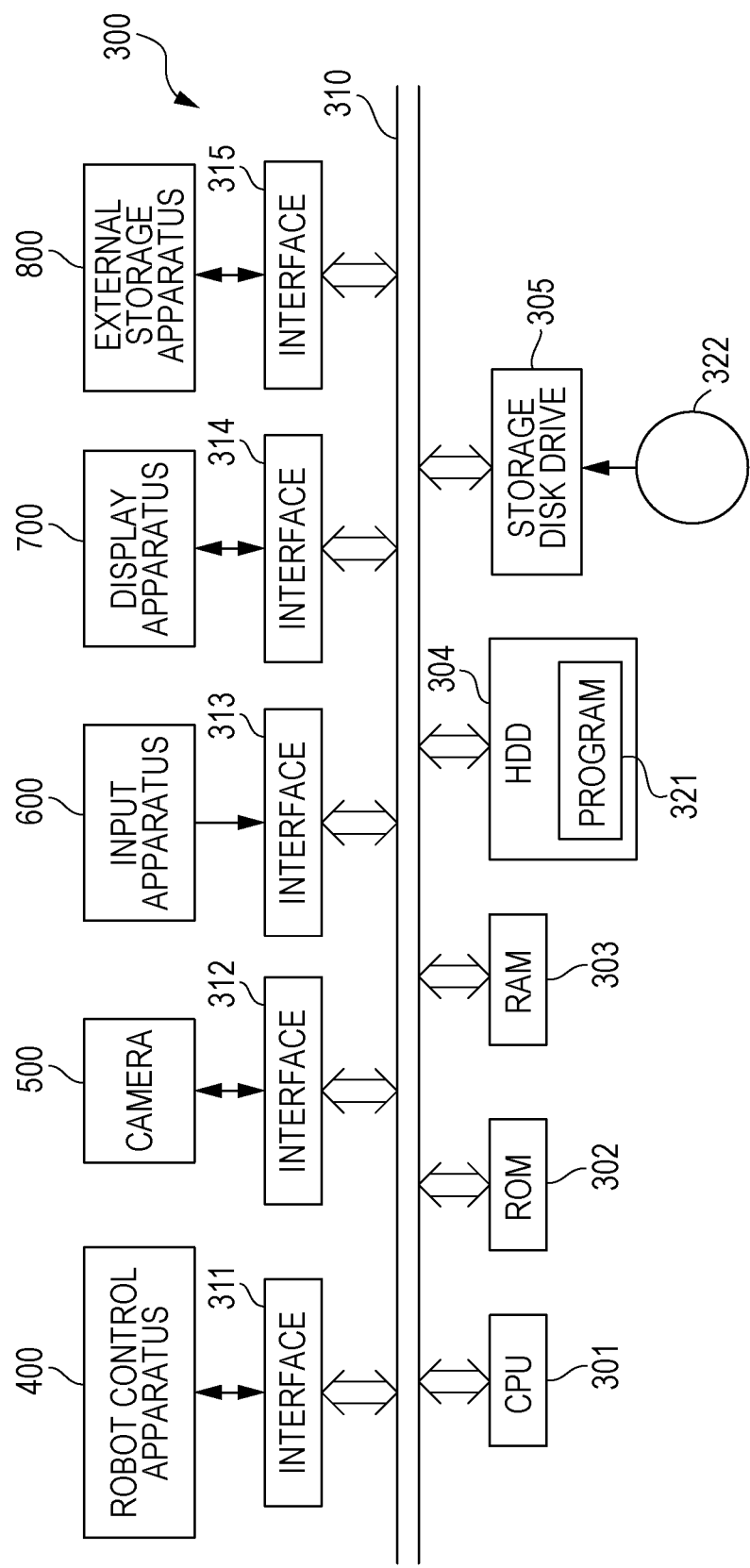
FIG. 2 is a block diagram illustrating a configuration of an image processing apparatus according to the first embodiment.

FIG. 2 is a block diagram illustrating a configuration of the image processing apparatus 300 according to the first embodiment. As illustrated in FIG. 2, the image processing apparatus 300 is configured to perform image processing and more specifically a pattern matching process. The image processing apparatus 300 may be realized by a computer. The image processing apparatus 300 includes a central processing unit (CPU) 301 serving as an operation unit (control unit). The image processing apparatus 300 includes a read only memory (ROM) 302, a random access memory (RAM) 303, and a hard disk drive (HDD) 304, which serve as a storage unit. The image processing apparatus 300 further includes a storage disk drive 305 and various interfaces 311 to 315.

The CPU 301 is connected to the ROM 302, the RAM 303, the HDD 304, the storage disk drive 305 and the interfaces 311 to 315 via a bus 310.

In the ROM 302, a boot program such as BIOS is stored. The RAM 303 is a storage apparatus that temporarily stores various kinds of data such as a result of an operational process performed by the CPU 301. In the HDD 304 a program 321 is stored (recorded). The CPU 301 reads out the program 321 and executes it to perform various processing steps of an image processing method or the like as described later. The storage disk drive 305 is capable of reading out various kinds of data, programs, and/or the like stored in the storage disk 322.

The interface 311 is connected to the robot control apparatus 400. The CPU 301 transmits a result of the image processing to the robot control apparatus 400 via the bus 310 and the interface 311.

The interface 312 is connected to the camera 500. The CPU 301 transmits a control signal such as a trigger signal or the like to the camera 500 via the bus 310 and the interface 312. The CPU 301 also acquires an image signal from the camera 500 via the bus 310 and the interface 312. The acquired image data is stored in the storage apparatus such as the HDD 304, the external storage apparatus 800, or the like under the control of the CPU 301.

The interface 313 is connected to the input apparatus 600 such as a mouse, a keyboard, or the like that is operated by an operator to transmit a command according to the operation to the CPU 301. The interface 314 is connected to the display apparatus 700 such as a display that displays an image. The interface 315 is connected to the external storage apparatus 800, for example, a rewritable nonvolatile memory such as a USB memory or the like or an external HDD or the like.

A method of pattern matching (an image processing method) performed by the image processing apparatus 300 is described below. The CPU 301 of the image processing apparatus 300 reads out the program 321 from the HDD 304 and executes it to perform various processing steps of the image processing as described below. First, a method of generating a first pyramid (a shape model) in the pattern matching process is described below.

Figure 3:
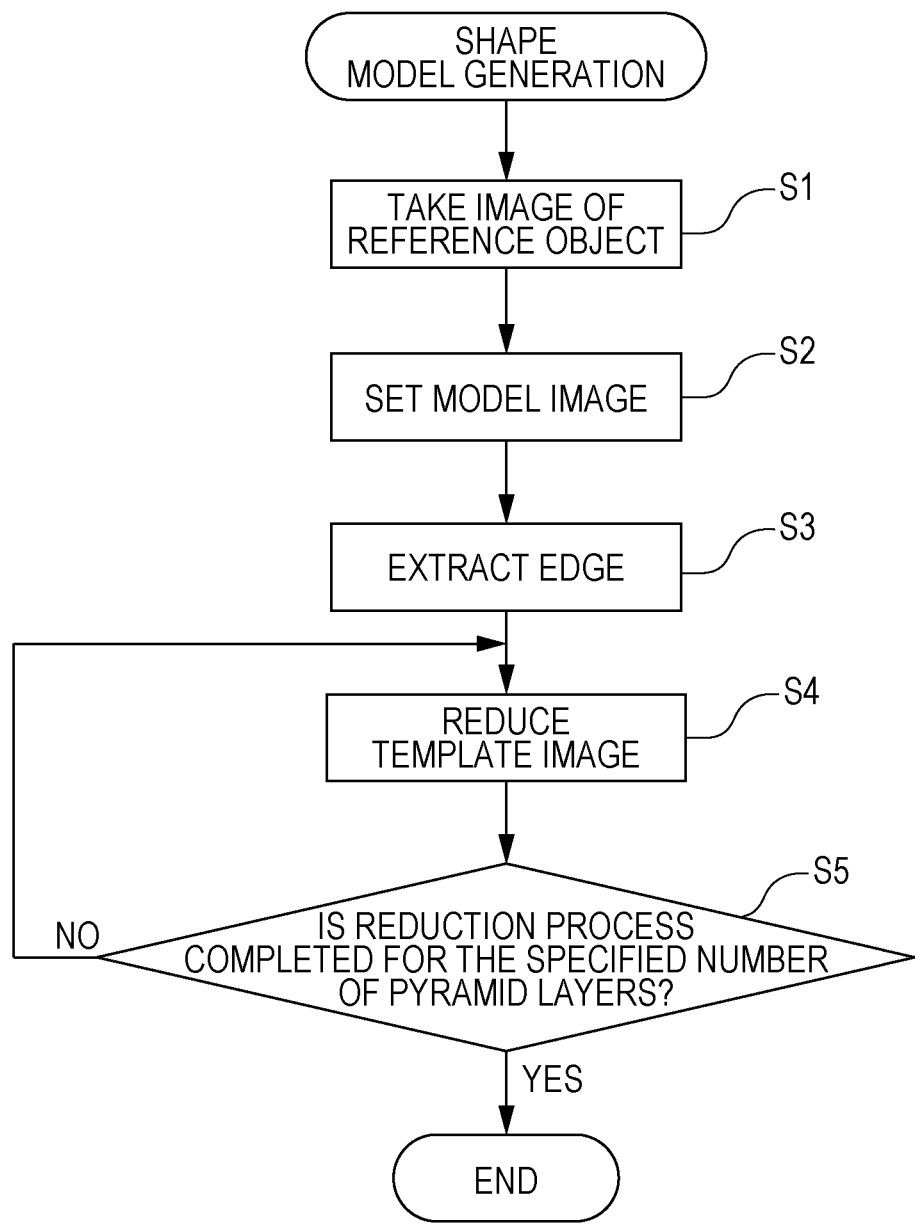
FIG. 3 is a flow chart illustrating a method of generating a first pyramid in an image processing method according to the first embodiment.

FIG. 3 is a flow chart illustrating the method of generating the first pyramid (the shape model) in the image processing method executed by the image processing apparatus 300 according to the first embodiment.

First, an operator sets a reference object in an ideal state in terms of a position, illumination, or the like. The CPU 301 controls the camera 500 to take an image of the reference object and acquires image data, that is, the reference image, in which the reference object is captured, from the camera 500 (S1). Note that the reference image may be taken and stored in advance in the storage apparatus such as the HDD 304, the external storage apparatus 800, or the like. In this case, the CPU 301 acquires the data of the reference image from the storage apparatus such as the HDD 304, the external storage apparatus 800, or the like.

The CPU 301 displays the reference image on the display apparatus 700, and extracts a rectangular area (a model image), specified by the operator, containing a part in which the reference object is captured, and sets it (S2). The rectangular area may be specified, for example, by clicking, with the input apparatus 600 such as a mouse or the like, on two points, that is, an upper left corner and a lower right corner of the rectangular area containing an image of the reference object in the reference image displayed on the display apparatus 700. That is, in this step S2, the CPU 301 extracts only the rectangular area defined by the two points (the upper left and lower right corners of the rectangular area) clicked by the operator from the reference image thereby setting the rectangular area as the model image.

The CPU 301 calculates an edge strength and an edge direction at each pixel in the model image set in step S2. The edge strength represents the magnitude of contrast (the steepness of the change in intensity). When there is a large difference in intensity between a pixel of interest and an adjacent pixel, the pixel of interest has a large edge strength. The edge direction is a direction (an angle) of contrast in which the pixel of interest has a maximum edge strength. The edge strength may be calculated using a Sobel filter in a direction along an x axis (in a horizontal direction of the image) and in a direction along a y axis (in the vertical direction of the image).

Figure 4:
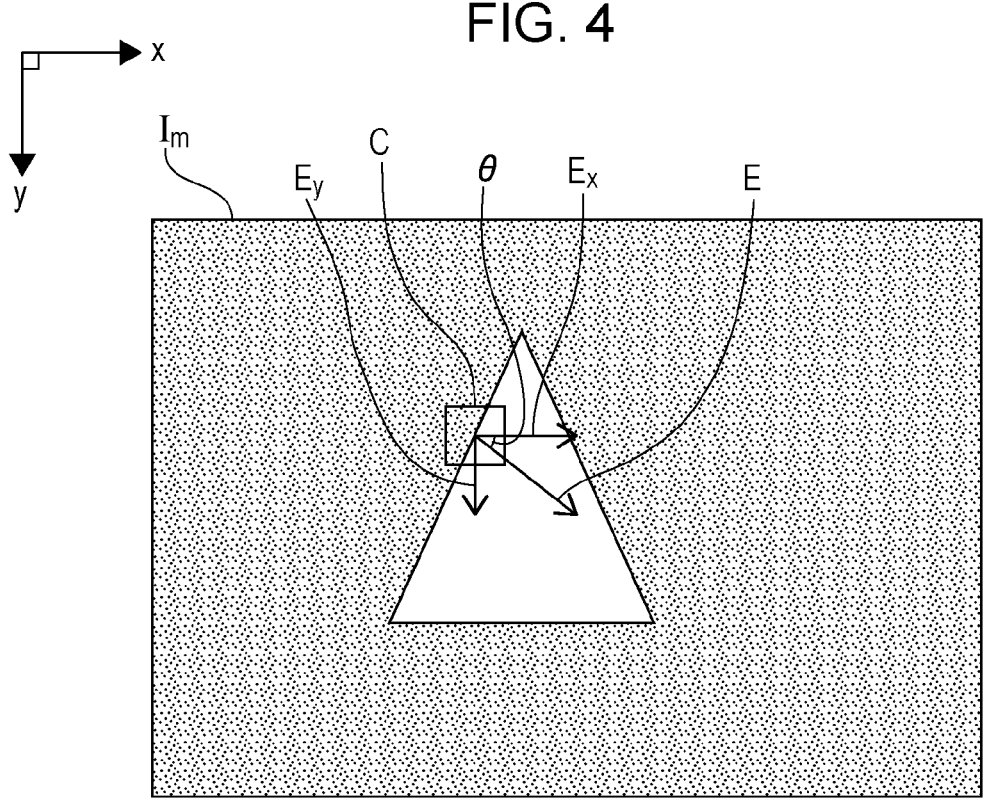
FIG. 4 is a diagram illustrating a manner in which an edge extraction process is performed on a model image.

FIG. 4 is a diagram illustrating a manner in which the edge extraction process is performed on a model image. First, the CPU 301 calculates an edge strength $E_x$ in the x direction and an edge strength $E_y$ in the y direction at a pixel C of interest in the model image $I_m$. The edge strength is expressed by a vector ($E_x$, $E_y$).

The CPU 301 determines the magnitude E of the edge strength at the pixel C of pixel such that the square root of the sum of squares of intensities $E_x$ and $E_y$ in the respective directions along the respective axes according to formula (1) described below.

$$E=\sqrt{E_x^2+E_y^2} \qquad (1)$$

Furthermore, the CPU 301 calculates an edge direction θ according to formula (2) described below.

$$\theta = \tan^{-1}\left(\frac{E_y}{E_x}\right) \qquad (2)$$

The CPU 301 determines the edge strength and the edge direction for each of all pixels of the model image by performing the calculation described above. Thereafter, the CPU 301 detects pixels at which the edge strength is higher than or equal to a particular constant threshold value thereby extracting an edge feature (edge points). The CPU 301 then generates a template image including a feature image (edge feature image) which is a set of a plurality of edge points (S3).

Figure 5:
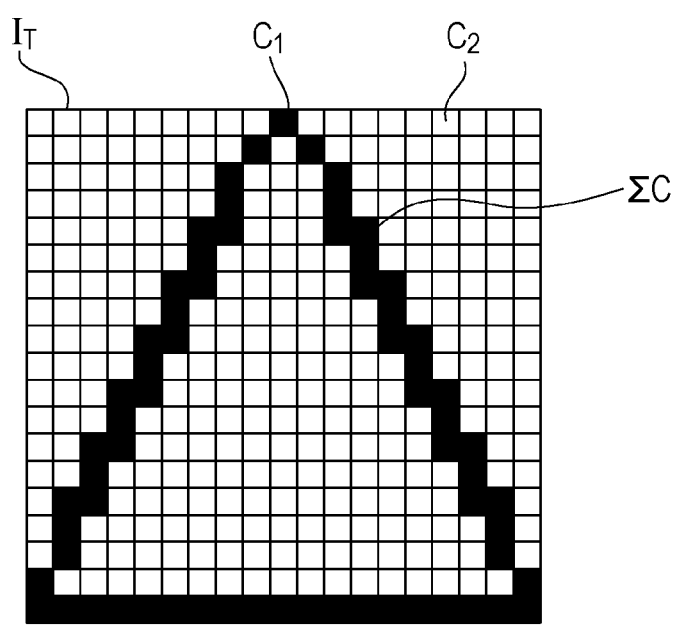
FIG. 5 is a diagram illustrating a template image including a feature image.

FIG. 5 is a diagram illustrating a template image including a feature image. In FIG. 5, in a template image $I_T$, each valid pixel indicating an edge feature (an edge point) is represented in black, and other invalid pixels are represented in white.

The data of the feature image may be stored, for example, as follows. Two channel data areas are prepared for each pixel of the image, and data is stored as illustrated in FIG. 5. Any pixel $C_1$ extracted as an edge feature pixel is a valid pixel, and thus information indicating the edge strength thereof is stored in a first channel, and information indicating the edge direction thereof is stored in a second channel. For any pixel $C_2$ determined as being not an edge feature pixel, an invalid value (for example, 0) is stored. Thus, the feature image is given by a set of pixels $C_1$ indicating edge points as denoted by $\Sigma C$ in FIG. 5.

Alternatively, an edge strength image in which only the edge strength is represented and an edge direction image in which only the edge direction is represented may be generated separately, and a combination of these two images may be given as a feature image. In the example described above, the Sobel filter is used in the calculation of the edge strength. Alternatively, other known edge extraction filters such as a Canny filter or the like may be used.

As described above, in step S3, the CPU 301 generates a template image including a feature image obtained by performing the edge extraction process on the model image, and sets the resultant template image including the feature image at the bottom layer of a first pyramid (the shape model).

Next, the CPU 301 reduces the template image including the feature image extracted in step S3 in a stepwise manner (S4) thereby generating template images for use in the pyramid search and setting them in middle and top layers.

Figure 6:
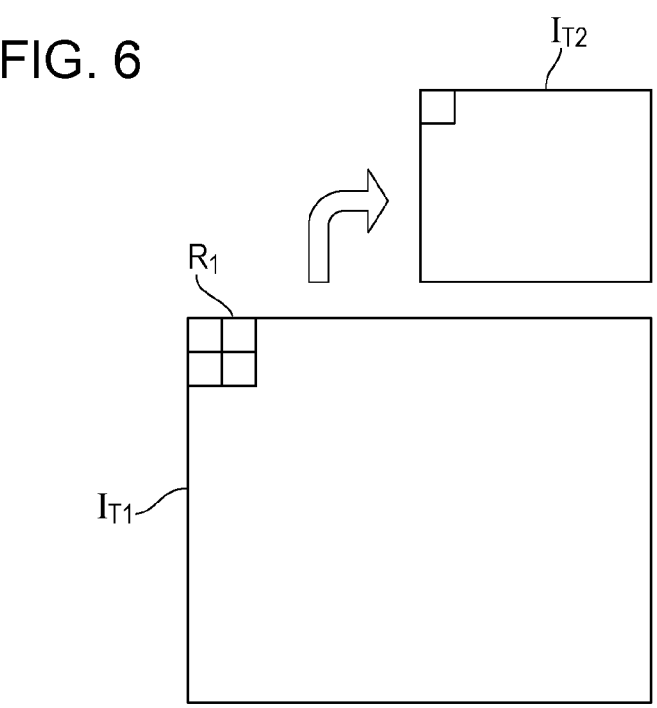
FIG. 6 is a diagram illustrating a manner in which a template image in a pyramid layer is reduced to generate a template image in an immediately upper pyramid layer.

FIG. 6 is a diagram illustrating a manner in which in a first pyramid, a template image $I_{T1}$ is reduced and a resultant reduced template image $I_{T2}$ is placed in an immediately upper layer in the first pyramid. First, as illustrated in FIG. 6, a rectangular area $R_1$ including 2×2 pixels is set in the upper left corner of the template image $I_{T1}$.

Next, when the edge feature (edge point) is expressed in the form of an edge vector, if two or more edge vectors exist in the rectangular area $R_1$ including 2×2 pixels, then the sum of these edge vectors is calculated and a resultant vector is employed as a vector representative of the edge feature of the rectangular area $R_1$ including 2×2 pixels. Note that the sum of edge vectors is calculated under the definition that the edge vector is a vector whose magnitude is given by the edge strength of the edge feature and whose direction is given by the edge direction. More specifically, the x-direction component $E_x$ of the magnitude of the vector obtained as the result of summing is given by formula (3), and the y-direction component $E_y$ is given by formula (4). In formula (3) and formula (4), $e_1$ to $e_4$ each represents a magnitude of corresponding one of the four edge vectors in the 2×2 pixel area and $\theta_1$ to $\theta_4$ each represents a direction thereof. The CPU 301 calculates a magnitude of the resultant vector from $E_x$ and $E_y$ according to formula (5). The CPU 301 further calculates a direction $\theta$ of the resultant vector from $E_x$ and $E_y$ according to formula (6).

$$E_x = e_1 \cos\theta_1 + e_2 \cos\theta_2 + e_3 \cos\theta_3 + e_4 \cos\theta_4 \quad (3)$$

$$E_y = e_1 \sin\theta_1 + e_2 \sin\theta_2 + e_3 \sin\theta_3 + e_4 \sin\theta_4 \quad (4)$$

$$E = \sqrt{E_x^2 + E_y^2} \quad (5)$$

$$\theta = \tan^{-1}\left(\frac{E_y}{E_x}\right) \quad (6)$$

Thus, one pixel in the feature image (the reduced edge feature image) in the template image $I_{T2}$ is defined by the resultant edge vector calculated from the 2×2 pixels. The CPU 301 performs the reduction process in the above-described manner for all pixels of the feature image in the template image $I_{T1}$ thereby generating the template image $I_{T2}$ (the reduced image) (S4).

Next, the CPU 301 determines whether template images have been generated for a specified number of pyramid layers (S5). In a case where the determination by the CPU 301 is that the reduction process in step S4 has not been yet performed the specified number of times (No in S5), the processing flow returns to step S4 to further perform the reduction process in the above-described manner on a template image obtained in a previous reduction process. On the other hand, in a case where the determination by the CPU 301 is that the reduction process has been performed the specified number of times (Yes in S5), the feature image reduction process is ended.

Figure 7:
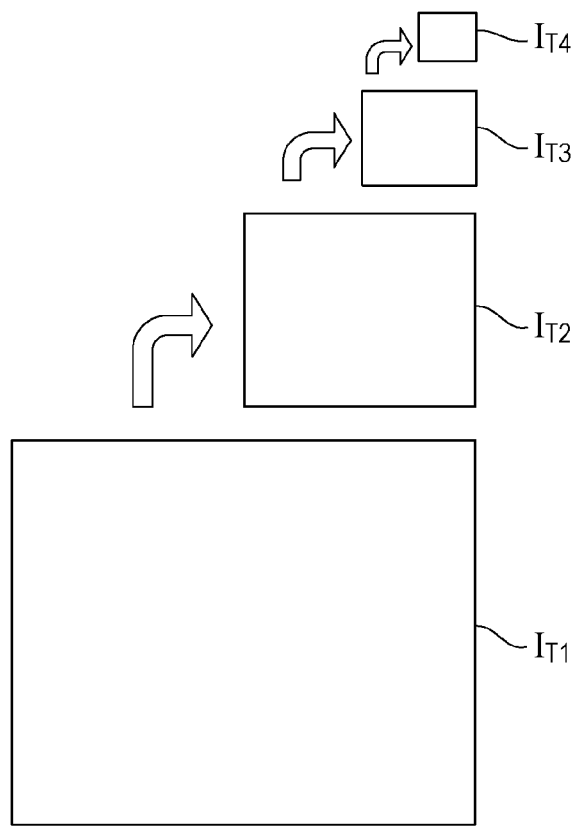
FIG. 7 is a diagram illustrating a generated first pyramid.

FIG. 7 is a diagram illustrating a generated first pyramid (shape model). As described in FIG. 7, the reduction is repeated three times to generate a total of four template images $I_{T1}$ to $I_{T4}$ each including a feature image with a different resolution. An operator may specify the number of first pyramid layers. The reduction is performed a particular number of times corresponding to the specified number of first pyramid layers. In general, in a case where an image has a high resolution, or in a case where an edge feature of a model is large and there are not many noise edges, it is allowed to specify a large number of pyramid layers. However, in an opposite case, it may be desirable to specify a small number of pyramid layers.

Thus, the first pyramid (the shape model) is generated such that the first pyramid includes a plurality of template images which are different in resolution from each other and each of which includes a feature image generated in steps S1 to S5 described above and such that the template images are placed hierarchically in pyramid layers in the order of resolution. That is, the plurality of template images of the first pyramid include the image obtained by performing the edge extraction process on the captured image obtained by taking the image of the reference object and the reduced images obtained by performing the reduction process on the image described above. The first pyramid generated in the above-described manner is stored in the storage apparatus such as the HDD 304, the external storage apparatus 800, or the like.

Figure 8:
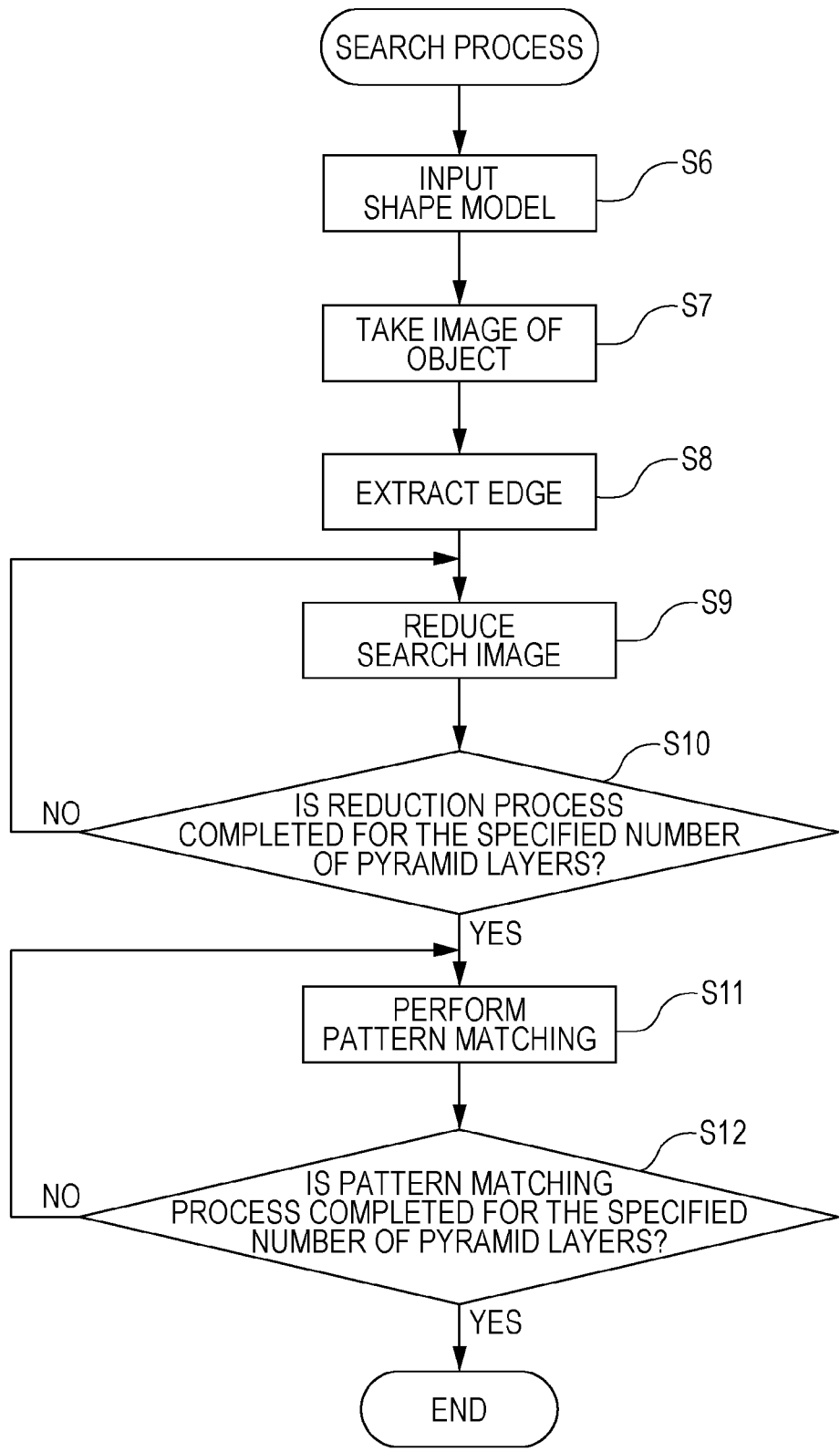
FIG. 8 is a flow chart illustrating a searching process in the image processing method according to the first embodiment.

Next, using the first pyramid generated in steps S1 to S5, a searching process is performed to actually detect an object as described below. FIG. 8 is a flow chart illustrating the searching process in the image processing method performed by the image processing apparatus according to the first embodiment.

First, the CPU 301 reads out the data of the shape model from the storage apparatus such as the HDD 304, the external storage apparatus 800, or the like in which the data of the first pyramid (the shape model) is stored (S6).

Next, the CPU 301 generates a second pyramid including a plurality of target object images having resolutions different from each other but equal to the resolutions of the template images in the first pyramid and being placed in a hierarchical manner in respective pyramid layers in the order of resolution.

More specifically, first, the CPU 301 controls the camera 500 to take an image of a target object to be detected, and acquires a captured image from the camera 500 (S7 (image capturing process)).

Next, the CPU 301 extracts an edge feature by performing the edge extraction process on the captured image acquired in step S7 in a similar manner to the edge extraction process (S3) to the model generation process, and generates a target object image including a feature image (a set of edge points) (S8).

Next, the CPU 301 reduces the target object image by performing the reduction process, as a number of times as specified by an operator, on the feature image in the target object image generated in step S8 in a similar manner to the edge image reduction process (steps S4 and S5) performed in generating the model (S9, S10).

Thus, via the process from step S7 to step S10, the image is obtained by performing the edge extraction process on the captured image obtained by taking the image of the target object, and the second pyramid is generated that includes the reduced images obtained by performing the reduction process on the image described above.

Next, the CPU 301 performs a pattern matching process using the first and second pyramids such that an image similar to a feature image included in a template image in the first pyramid is searched for from a target object image in the second pyramid by evaluating similarity between images in corresponding layers on a layer-to-layer basis (S11).

First, the pattern matching is performed between feature images with a largest reduction ratio. After the pattern matching is completed for this reduction ratio, the pattern matching is performed between images with a next largest reduction ratio. When the pattern matching has been performed until the pattern matching is completed for images with no reduction, the pattern matching is ended (S12). As described above, the pattern matching process is performed from layer to layer in the order of the resolution from the lowest resolution to the highest resolution. That is, the pattern matching process is performed layer to layer in the order of layers from the top layer in which the resolution is lowest to the bottom layer in which the resolution is highest.

The method of performing the pattern matching between images with the same reduction ratio sequentially from layer to another is called pyramid search. The image with no reduction is located in the first pyramid layer (bottom layer), and the image in the top layer has the largest reduction ratio.

The CPU 301 outputs a recognition result obtained via steps S11 and S12 to the robot control apparatus 400. The robot control apparatus 400 controls the robot 200 to perform an assembling process so as to assemble a work W1, which is the recognized target object, to a work W2 which is a receiving member. As a result, an assembly W is produced.

Figure 9:
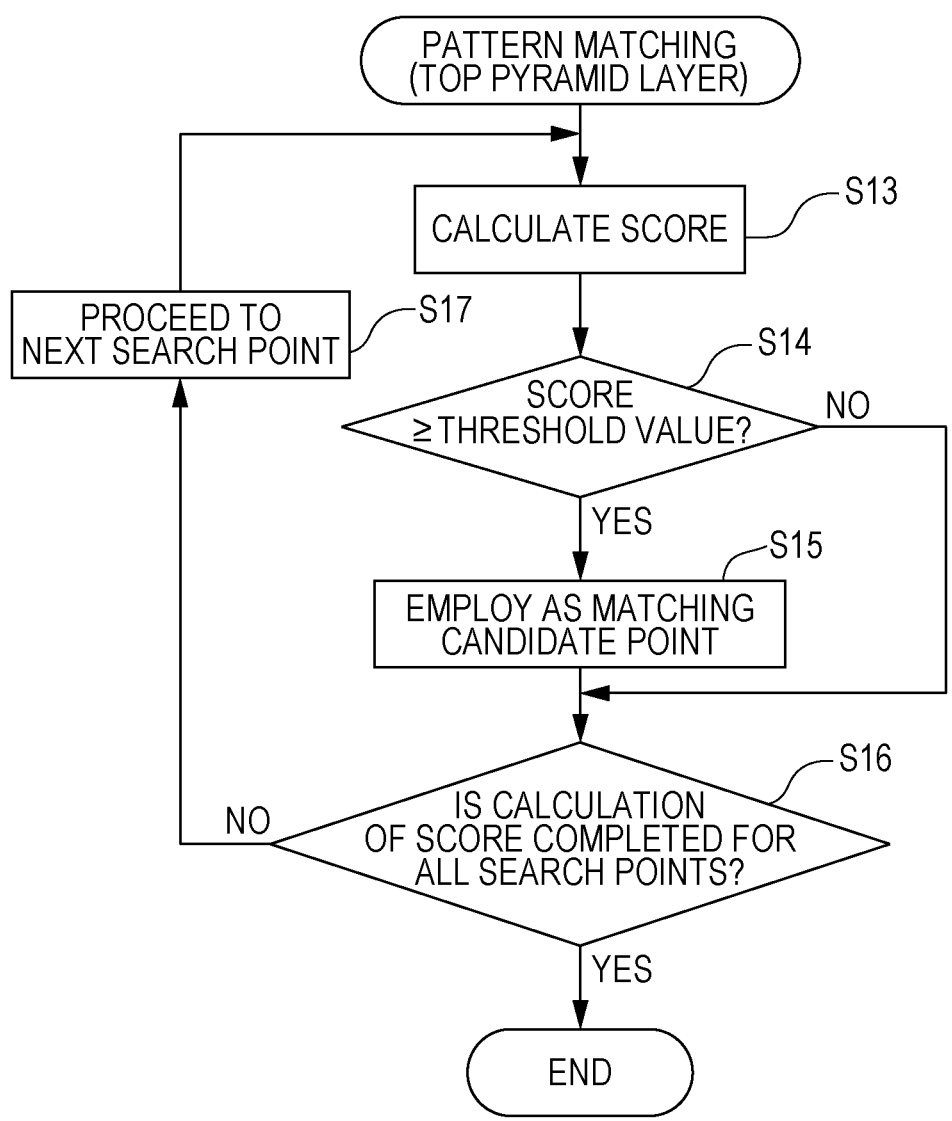
FIG. 9 is a flow chart illustrating a pattern matching process in the image processing method according to the first embodiment.
Figure 10:
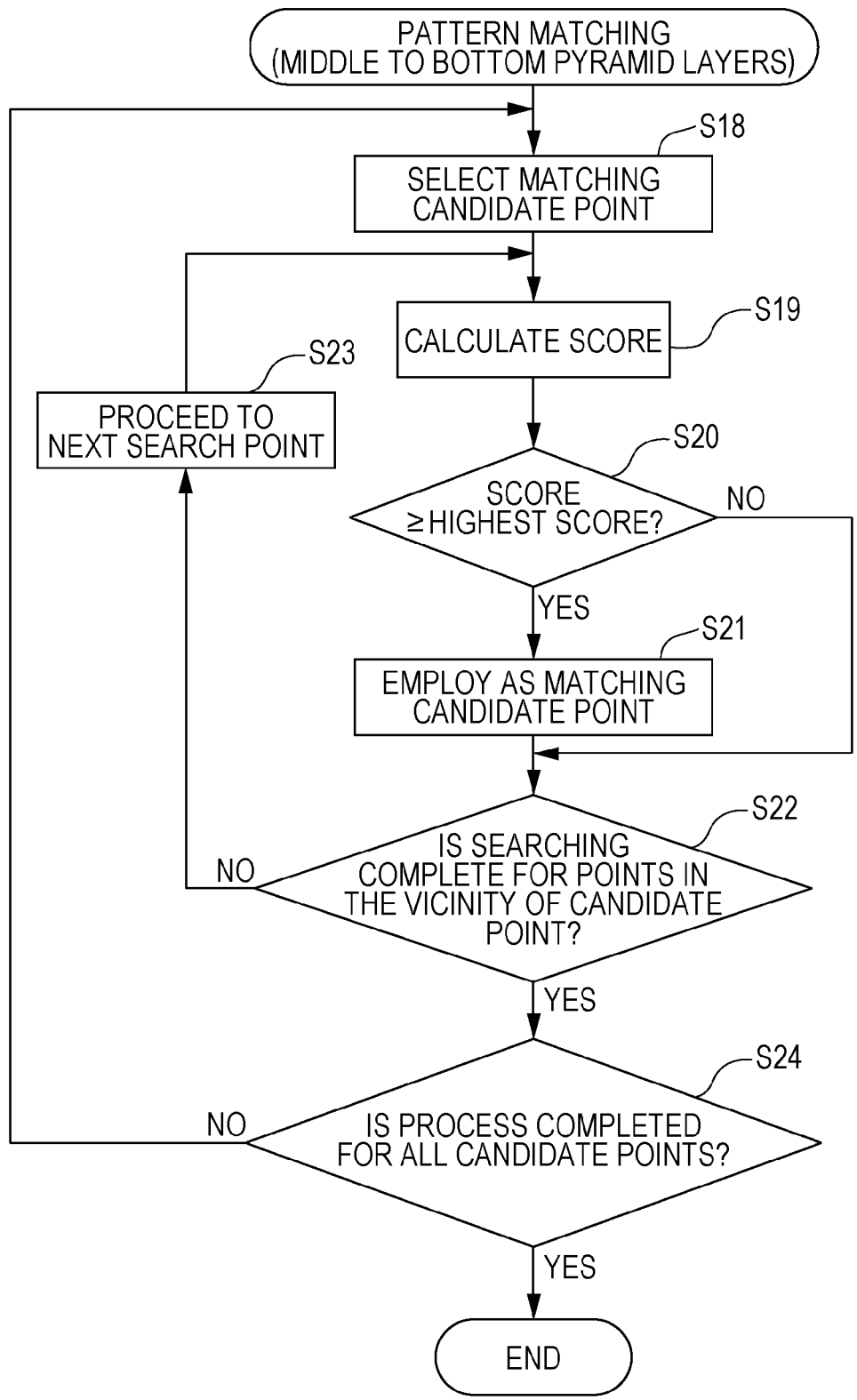
FIG. 10 is a flow chart illustrating a pattern matching process in the image processing method according to the first embodiment.
Figure 11:
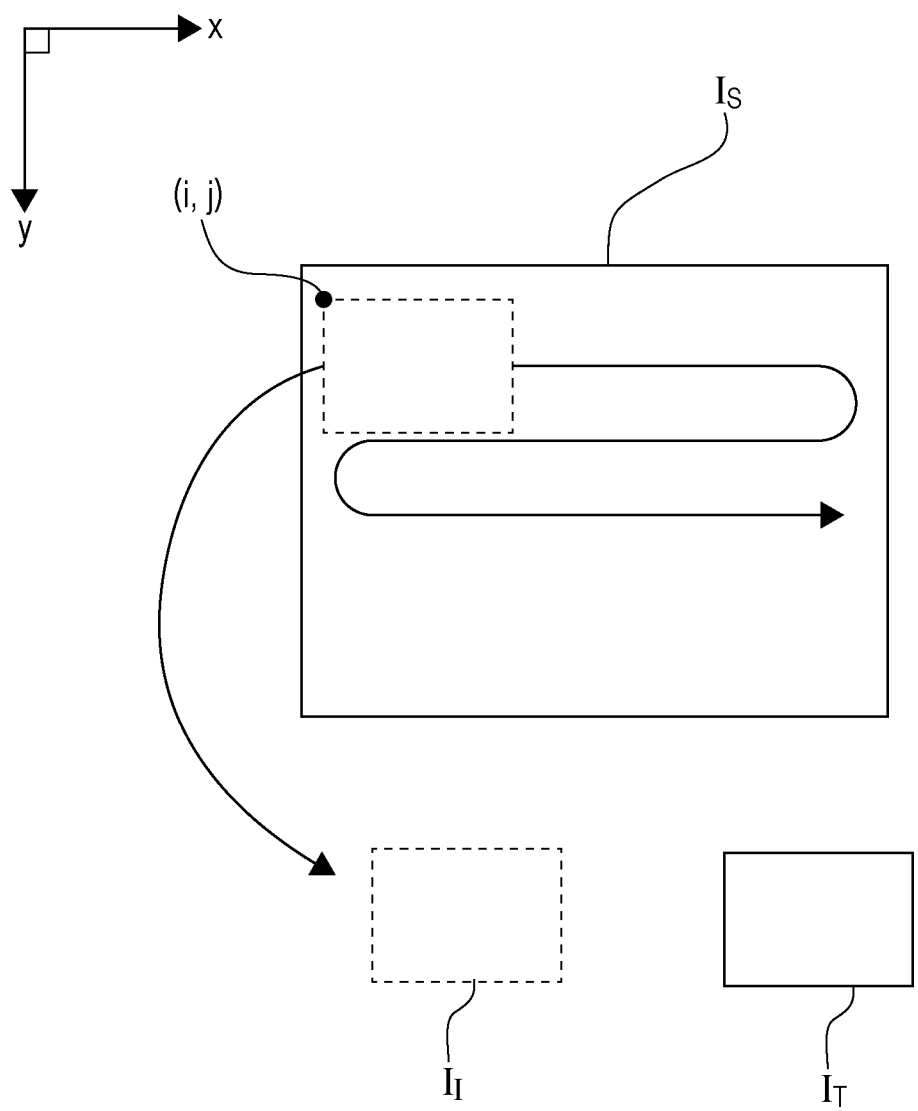
FIG. 11 is a diagram illustrating a manner in which a pattern matching process is performed.

Next, the pattern matching process in step S11 is described in further detail below. FIG. 9 and FIG. 10 are flow charts illustrating the pattern matching process in the image processing method performed by the image processing apparatus according to the first embodiment. In FIG. 9, the pattern matching process for the top pyramid layer is illustrated, while in FIG. 10 the pattern matching process for other middle pyramid layers and the bottom layer is illustrated. FIG. 11 illustrates a manner in which the pattern matching process is performed. As illustrated in FIG. 11, an image $I_I$ having the same size as that of a template image $I_T$ is extracted from a target object image $I_S$ by repeating the pattern matching process while shifting the template image $I_T$ by one pixel at a time in the x and y directions within the target object image $I_S$.

The CPU 301 calculates a score to determine the degree of similarity R between the extracted image $I_I$ and the template image $I_T$ (S13).

Next, the CPU 301 determines whether the score (the degree of similarity R) obtained as a result of the score calculation is greater than or equal to a threshold value (S14).

In a case where the determination by the CPU 301 is that the score is greater than or equal to the threshold value (Yes in S14), the CPU 301 employs a position (i, j) at which the image $I_I$ is detected and a rotation angle (in degree) thereof as a matching candidate point (S15). This matching candidate point is stored in the storage apparatus such as the HDD 304, the external storage apparatus 800, or the like. On the other hand, in a case where the determination by the CPU 301 is that the score is smaller than the threshold value (No in S14), the CPU 301 determines that there is no matching candidate point, and the CPU 301 directly advances the processing flow to step S16.

The CPU 301 determines whether the searching (the score calculation) is completed for all search positions (S16). In a case where the determination by the CPU 301 is that the score calculation is not yet completed for all search positions (No in S16), the CPU 301 select a next search position (i, j) (S17) and returns the processing flow to step S13 to repeat the score calculation. When the score calculation is completed for all search positions in the search image (Yes in S16), the processing for the top pyramid layer is ended.

Next, the pattern matching process for the remaining middle pyramid layers and the bottom layer is described below with reference to FIG. 10. First, the CPU 301 selects one of stored matching candidate points detected in an immediately upper pyramid layer (S18).

The CPU 301 performs the searching in a next pyramid layer within a range in the vicinity of the stored matching position (i, j). When the pyramid layer is lowered by one layer, the position corresponding to (i, j) is given by a position (2i, 2j) having coordinate values twice the greater than a coordinate values (i, j), and thus the score calculation (the calculation of the degree of similarity) is performed within a neighboring area including 5×5 pixels centered at (2i, 2j) (S19). The score calculation is performed in a similar manner to step S13.

The CPU 301 detects a position at which a highest score is obtained within the range including 5×5 pixels around one candidate point and employs the detected position as a next matching candidate point (S20, S21). This matching candidate point is stored in the storage apparatus such as the HDD 304, the external storage apparatus 800, or the like.

When the score calculation at search positions of the 5×5 pixels is completed, the CPU 301 selects a next candidate point and performs the process in steps S19 to S23 on the selected candidate point. The CPU 301 determines whether the process is completed for all candidate points (S24). In a case where the process is completed (Yes in S24), the pattern matching process for the present pyramid layer is ended.

As illustrated in steps S11 to S12 in FIG. 8, the process is repeated until the process is completed for all pyramid layers in the order from the top pyramid layer to the bottom pyramid layer via middle pyramid layers including as many layers as specified. A position (i, j) at which a highest score is obtained in the bottom pyramid layer is employed as a detected position of the object in the search image.

Next, the score calculation (the similarity calculation) in step S13 in FIG. 9 and in step S19 in FIG. 10 is described in further detail below.

Figure 12:
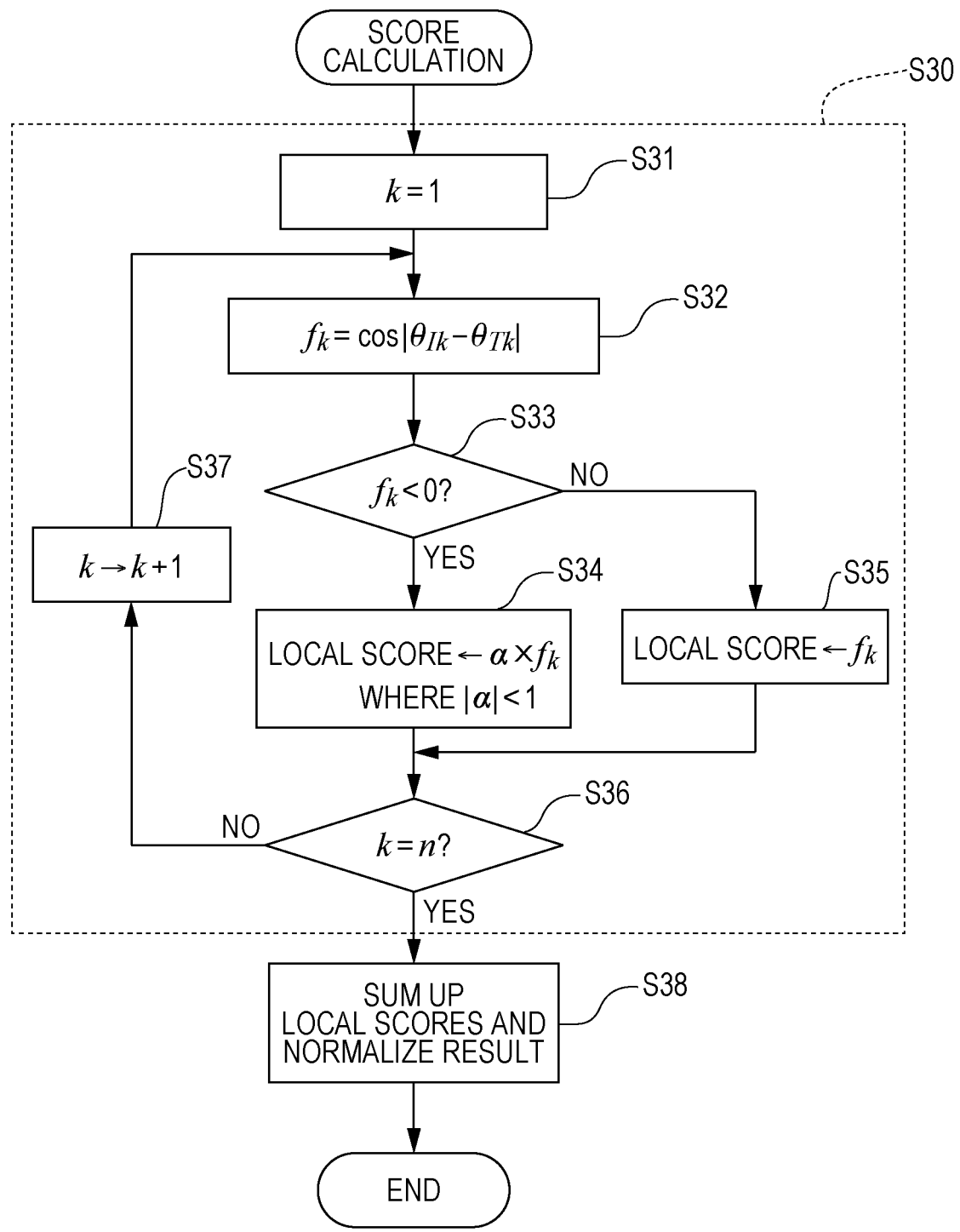
FIG. 12 is a flow chart illustrating a score calculation process in the image processing method according to the first embodiment.

FIG. 12 is a flow chart illustrating the score calculation process (similarity calculation process) in the image processing method performed by the image processing apparatus according to the first embodiment.

First, the CPU 301 calculates a local score (a degree of local similarity) associated with an edge point in a feature image in a template image and a point, in a target object image, at a position corresponding to the edge point of the feature image for all points in the feature image in the template image (S30 (local similarity calculation process)). That is, the CPU 301 calculates the local score (the degree of local similarity) representing the degree of similarity between two pixels with the same coordinates one of which is located in the feature image in the template image and the other one of which is located in the image extracted from the target object image.

Next, the CPU 301 determines a score (degree of similarity) by summing up the local scores calculated in step S30 and normalizing the resultant value (S38 (similarity calculation process)). For example, in a case where the feature image in the template image includes n edge points (n pixels), the normalization is accomplished by dividing the sum of local scores by n.

Next, the concept of the process in steps S30 and S38 is described below. The degree of similarity is determined by pattern matching according to formula (7) shown below.

$$R_{IJ} = \frac{1}{n}\sum_{k=1}^{n} \cos|\theta_{Ik} - \theta_{Tk}| \times \alpha \quad (7)$$

α=1 for $|\theta_{IK}-\theta_{Tk}|\leq 90°$
α<1 (and more preferably α=0) for $|\theta_{IK}-\theta_{Tk}|>90°$
where
$R_{IJ}$: degree of similarity at position (i,j) in an image
n: number of edge points
$\theta_I$: edge direction in target object image
$\theta_T$: edge direction in template image The local score for an edge point of interest is determined by calculating the value of cosine of the difference in angle between the edge direction at an edge point in the feature image in the template image and the edge direction at an edge point, with the same coordinates as those of the edge point in the feature image in the template image, in the feature image in the target object image. The local score is determined for all edge points in the feature image in the above described manner, and the local scores at the respective edge points are summed up. The sum of the local scores is normalized by dividing it by the number, n, of edge points of the model. As a result, the final score (the degree of similarity) which is normalized within a range from 0 to 1 is obtained. In formula (7) described above, a position (i, j) in the image refers to a position in the target object image $I_S$ shown in FIG. 11 obtained by extracting an image with a size corresponding to the size of the template image $I_T$ from the target object image $I_S$, and this position (i, j) is denoted as a matching candidate point. The degree of similarity R is calculated within a range of all parallel translations. The degree of similarity is expressed by a value in a range from 0 to 1. The highest degree of similarity is expressed by 1, and the lowest degree of similarity is expressed by 0.

In formula (7), the value of cosine is multiplied by a coefficient α. When $|\theta_{IK}-\theta_{Tk}|\leq 90°$, α=1, while when $|\theta_{IK}-\theta_{Tk}|>90°$, α<1 (and more preferably α=0). Note that formula (7) is a conceptual representation of the process in steps S30 and S38. In the first embodiment, the CPU 301 does not necessarily perform the calculation directly according to formula (7) (with α varied depending on the situation), although the CPU 301 may directly use formula (7) in the calculation.

A specific example of a method of calculating each local score in step S30 is described below. Note that the result of the calculation of the degree of similarity is the same as that according to formula (7).

First, the CPU 301 assigns serial numbers from 1 to n to edge points in the feature image in the template image, and sets a variable k to 1 to calculate the local score starting with the serial number of 1 (S31).

The CPU 301 calculates a tentative local score (tentative degree of local similarity) $f_k$ between an edge point in the feature image in the template image and an edge point in the feature image in the target object image at a position corresponding to the edge point in the feature image in the template image (S32).

Herein, the edge direction at the edge point (the pixel) assigned a serial number k in the feature image in the template image is denoted by $\theta_{Tk}$. Furthermore, in the target object image, the edge direction at a point (a pixel) at a position corresponding to the edge point in the feature image in the template image, that is, at the same coordinates as the coordinates of the edge point of the serial number k is denoted by $\theta_{IK}$. The tentative local score is determined by calculating cosine of an angle made by the edge direction $\theta_{Tk}$ and the edge direction $\theta_{Tk}$, that is, $|\theta_{IK}-\theta_{Tk}|$. That is, in step S32, the CPU 301 calculates the tentative local score $f_k$ according to formula (8) shown below.

$$f_k = \cos|\theta_{IK}-\theta_{Tk}| \quad (8)$$

The reason why the value calculated herein is called the tentative local score is that a determination is performed later as to whether this value is directly employed as a final local score or the value is subjected to a correction and the corrected value is employed as a final local score. Thus, this value is called the tentative local score (the degree of local similarity).

Next, the CPU 301 determines whether the tentative local score $f_k$ is lower than or equal to a predetermined value (0 in the first embodiment) (S33). Note that the tentative local score $f_k$ is lower than 0 when the angle made by the edge direction $\theta_{Tk}$ and the edge direction $\theta_{IK}$ is greater than 90°. Such a situation may occur, for example, when a change occurs in edge direction at some point due to adhesion of dust, or dirt, a change in illumination, an object-to-object difference in surface store, or the like. That is, in this step S33, a determination is performed as to whether in the target object image, a change in edge direction has occurred at some point corresponding to the edge point in the template image.

In a case where the determination by the CPU 301 is that the tentative local score $f_k$ is lower than the predetermined value (0) (Yes in S33), the tentative local score $f_k$ is changed such that its absolute value is reduced and the resultant reduced value is employed as the local score (S34).

In a case where the determination by the CPU 301 is that the tentative local score $f_k$ is higher than or equal to the predetermined value (0) (No in S33), the CPU 301 employs the tentative local score $f_k$ as the final local score (S35). That is, in this case, no partial change in edge direction is found, the tentative local score $f_k$ is directly employed as the final local score.

In a case where there is a local change in edge direction, in particular, when the edge direction is inverted, there is a possibility that the local score at this point has an extremely low value, even a negative value. If such a local score is directly used, there is a possibility that the final score is extremely low.

In the present embodiment, to handle such a situation, in step S34, the tentative local score $f_k$ is changed such that its absolute value becomes smaller and the resultant reduced value is employed as the local score. More specifically, the tentative local score $f_k$ is corrected by multiplying it by a coefficient α so as to change the absolute value of the local score to a lower value (that is, to a value close to 0). Note that |α|<0, that is, the absolute value of the coefficient α is smaller than 1.

This makes it possible to reduce an influence of adhesion of dust or dirt, a change in illumination, an object-to-object difference in surface state, or the like on the final score.

In particular, to change the local score to a value close to 0, it may be desirable that the coefficient α is set within a value greater than or equal to −0.1 and smaller than or equal to 0.1, and it is more desirable that the coefficient α is set to 0 to make it possible to change the local score to 0. Thus by setting the coefficient α to a value greater than or equal to −0.1 and smaller than or equal to 0.1, it is possible to reduce an influence of adhesion of dust or dirt, a change in illumination, an object-to-object difference in surface state, or the like on the final score. In particular, when the coefficient α is set to 0, then the local score becomes equal to 0, and thus it is possible to more effectively reduce an influence of adhesion of dust or dirt, a change in illumination, an object-to-object difference in surface state, or the like on the final score.

The process in step S38 makes it possible to prevent the final score from becoming too small and thus it becomes possible to prevent the pattern matching process from failing. In particular, by setting the coefficient α to a value greater than or equal to −0.1 and smaller than or equal to 0.1, it becomes possible to effectively prevent the pattern matching process from failing. By setting the coefficient α to 0, it becomes possible to more effectively prevent the pattern matching process from failing.

When the tentative local score has a negative value, the sign of the value may be changed and the resultant value may be employed as the local score. However, in this case, there is a possibility that the final score becomes too high, which may cause a large number of matching candidate points to occur. Thus, in the following pyramid search, the degree of similarity judgement is performed for the large number of matching candidate points, which takes a long processing time. Thus this method may not be efficient.

In contrast, in the first embodiment, in the case where the tentative local score is lower than the predetermined value (0), the tentative local score is multiplied by the coefficient α (|α|<1) to reduce the magnitude thereof thereby preventing the final score from becoming too high. Thus it is possible to prevent the number of matching candidate points from becoming too large. As a result, a reduction in calculation cost and a reduction in processing time are achieved, and an increase in the processing speed of the pattern matching process is achieved.

In particular, in a case where α is set to 0, if an inversion of the edge direction due to adhesion of dust, dirt, or the like, a change in illumination, an object-to-object difference in surface state, or the like, is found at some point, then the value added to the score is 0. The final score is determined by summing up the scores only among points where no inversion occurs. This makes it possible to minimize the reduction in the score even in a situation in which an inversion of the edge direction occurs at some of edges of a search target object. For example, in a case where an inversion occurs at 20% of all edge points in the target object image, the remaining 80% of edges can provide an about 80% of a score that is likely to be a true value. In this method, because the sum of scores is calculated only among edges where no inversion in the edge direction occurs, the probability is minimized that a high score occurs at a search position where actually no target object exists. This prevents an excessively large number of matching candidate points from occurring at an early or middle stage in the pyramid search, and thus the calculation cost in the pyramid search is minimized, and the reduction in the processing speed is prevented.

In step S34 described above, the local score is determined by calculating $\alpha \times f_k$. Alternatively, the local score may be set to 0 without performing the above-described calculation. In this case, the same effect is obtained as the effect obtained when α=0. Besides, the unnecessity of the calculation of $\alpha \times f_k$ allows a further reduction in calculation cost, a further reduction in processing time, and a further increase in the processing speed of the pattern matching process. Furthermore, in step S33 described above, it is assumed that the predetermined value is 0. However, the predetermined value may be a value other than 0.

Second Embodiment

Figure 13:
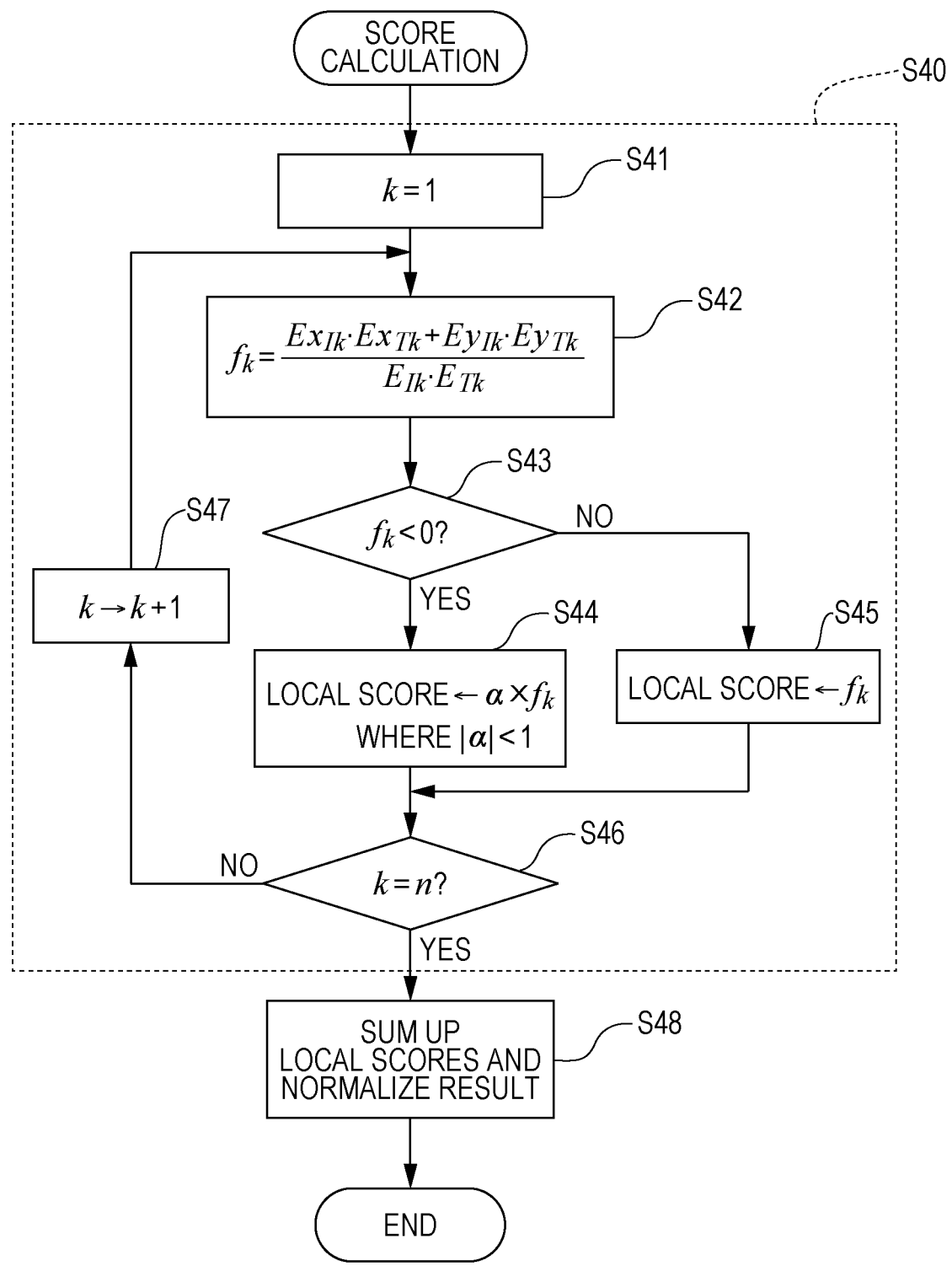
FIG. 13 is a flow chart illustrating a score calculation process in an image processing method according to a second embodiment.

Next, an image processing method executed by an image processing apparatus according to a second embodiment is described below. FIG. 13 is a flow chart illustrating the score calculation process (similarity calculation process) in the image processing method performed by the image processing apparatus according to the second embodiment. In the following description of the second embodiment, a duplicated description of units or processes similar to those according to the first embodiment is omitted.

The image processing apparatus according to the second embodiment is configured in a similar manner to the image processing apparatus 300 according to the first embodiment described above. Furthermore, the image processing by the image processing apparatus according to the second embodiment is performed in a similar manner to the first embodiment except for the score calculation process (FIG. 12). That is, the processes illustrated in FIG. 3, FIG. 8, FIG. 9, and FIG. 10 are similar for both the first and second embodiments. In the second embodiment, the processing (the program 321) executed by the CPU 301, in particular, the score calculation process (similarity calculation process) is different from the first embodiment, and more particularly, the tentative local score (the tentative degree of local similarity) is calculated in a different manner from the first embodiment.

First, the CPU 301 calculates a local score (a degree of local similarity) at an edge point in the feature image in the template image in terms of similarity with respect to a point at a position corresponding to the edge point in the feature image in the template image, for all points in the feature image in the template image (S40 (local similarity calculation process)). That is, the CPU 301 calculates the local score (the degree of local similarity) in terms of similarity between a pixel in the feature image in the template image and a pixel in the extracted image extracted from the target object image for each combination of pixels in the respective images having the same coordinates.

The CPU 301 calculates the sum of local scores determined in step S40 and further normalizes the resultant sum thereby determining the score (the degree of similarity) (S48 (similarity calculation process)). For example, in a case where the feature image in the template image includes n edge points (n pixels), the normalization is accomplished by dividing the sum of local scores by n.

Next, the concept of the process in steps S40 and S48 is described below. The degree of similarity is determined by pattern matching according to formula (9) shown below.

$$R_{IJ} = \frac{1}{n}\sum_{k=1}^{n} \frac{Ex_{Ik} \cdot Ex_{Tk} + Ey_{Ik} \cdot Ey_{Tk}}{E_{Ik} \cdot E_{Tk}} \times \alpha \tag{9}$$

$\alpha=1$ for $Ex_{IK}\cdot Ex_{Tk}+Ey_{IK}\cdot Ey_{Tk} \geq 0$ $|\alpha|<1$ (and more preferably $\alpha=0$) for $Ex_{IK}\cdot Ex_{Tk}+Ey_{IK}\cdot Ey_{Tk}<0$ where $R_{I,J}$: degree of similarity at position (i,j) in an image n: number of edge points $E_I$: edge strength in target object image $E_T$: edge strength in template image $E_{XI}$: edge strength in x direction in target object image $E_{XT}$: edge strength in x direction in template image $E_{YI}$: edge strength in y direction in target object image $E_{YT}$: edge strength in y direction in template image The local score may be calculated using the edge strength in the x direction, the edge strength in the y direction, and the magnitude of the edge strength at a point in the feature image in the template image and those at a point in the target object image. By performing this process for all edge points in the feature image, it is possible to determine the sum of local scores over all edge points. The sum of the local scores is normalized by dividing it by the number, n, of edge points of the model. As a result, the final score (the degree of similarity) normalized within a range from 0 to 1 is obtained.

The inner product between a vector ($Ex_{Tk}$, $Ey_{Tk}$) indicating an edge strength at an edge point with a serial number k in the feature image and a vector ($Ex_{IK}$, $Ey_{IK}$) indicating an edge strength at a point, at a position corresponding to the edge point with the serial number k, in the target object image is given by $Ex_{IK}\cdot Ex_{Tk}+Ey_{IK}\cdot Ey_{Tk}$. The magnitudes of the respective vectors are $E_{IK}$ and $E_{Tk}$.

In formula (9), the inner product is divided by the product of magnitudes of the respective vectors and the result is multiplied by a coefficient $\alpha$. When $Ex_{IK}\cdot Ex_{Tk}+Ey_{IK}\cdot Ey_{Tk}\geq 0$ the $\alpha=1$, while when $Ex_{IK}\cdot Ex_{Tk}+Ey_{IK}\cdot Ey_{Tk}<0$ then $|\alpha|<1$ (and more preferably $\alpha=0$). Note that formula (9) is a conceptual representation of the process in steps S40 and S48. In the second embodiment, the CPU 301 does not necessarily perform the calculation directly according to formula (9) (with $\alpha$ being varied depending on the situation), although the CPU 301 may directly use formula (9) in the calculation.

A specific example of a method of calculating each local score in step S40 is described below. Note that the result of the calculation of the degree of similarity is the same as that according to formula (9).

First, the CPU 301 assigns serial numbers from 1 to n to edge points in the feature image in the template image, and sets the variable k to 1 to calculate the local score starting with the serial number of 1 (S41). The process in this step S41 is the same as the process in step S31 (FIG. 12) according to the first embodiment.

Next, the CPU 301 calculates the tentative local score (the tentative degree of local similarity) $f_k$ representing the tentative degree of local similarity between an edge point in the feature image in the template image and a point at a position corresponding to the edge point in the feature image in the target object image (S42).

The calculation of the tentative local score according to the second embodiment is different from that according to the first embodiment described above. Herein, a vector (a first vector) representing the edge strength at an edge point (a pixel) having a serial number k in the feature image is denoted as ($Ex_{Tk}$, $Ey_{Tk}$). Furthermore, a vector (a second vector) representing the edge strength at a point (pixel), in the target object image, at a position corresponding to the edge point in the feature image, that is, at the same coordinates as the coordinates of the edge point assigned a serial number k is denoted as ($Ex_{IK}$, $Ey_{IK}$). The magnitudes of the first vector is denoted as $E_{Tk}$, and the magnitudes of the second vector is denoted as $E_{IK}$.

The tentative local score is determined by dividing the inner product between the first vector ($Ex_{Tk}$, $Ey_{Tk}$) and the second vector ($Ex_{IK}$, $Ey_{IK}$) by the product of the magnitude $E_{Tk}$ of the first vector and the magnitude $E_{IK}$ of the second vector.

That is, in step S42, the CPU 301 calculates the tentative local score $f_k$ according to formula (10) shown below.

$$f_k = \frac{Ex_{Ik}\cdot Ex_{Tk}+Ey_{Ik}\cdot Ey_{Tk}}{E_{Ik}\cdot E_{Tk}} \tag{10}$$

The process from step S43 to step S47 is performed in a similar manner to the process from step S33 to step S37 (FIG. 12) according to the firsts embodiment described above, and thus a further detailed description thereof is omitted.

In the second embodiment, in step S44, the tentative local score $f_k$ is changed such that its absolute value is reduced and the resultant reduced value is employed as the local score. More specifically, the tentative local score $f_k$ is multiplied by the coefficient $\alpha$ so as to change the absolute value of the local score to a lower value (that is, such that the local score has a value close to 0). Note that $|\alpha|<0$, that is, the absolute value of the coefficient $\alpha$ is smaller than 1.

In particular, to change the local score to a value close to 0, it may be desirable that the coefficient $\alpha$ is set within a value greater than or equal to −0.1 and smaller than or equal to 0.1, and it is more desirable that the coefficient $\alpha$ is set to 0 to make it possible to change the local score to 0. That is, by setting the coefficient $\alpha$ to a value greater than or equal to −0.1 and smaller than or equal to 0.1, it is possible to reduce an influence of adhesion of dust or dirt, a change in illumination, an object-to-object difference in surface state, or the like on the final score. In particular, when the coefficient $\alpha$ is set to 0, then the local score becomes equal to 0, and thus it is possible to more effectively reduce an influence of adhesion of dust or dirt, a change in illumination, an object-to-object difference in surface state, or the like on the final score.

As described above, the process in step S48 makes it possible to prevent the final score from becoming too small and thus it becomes possible to prevent the pattern matching process from failing. In particular, by setting the coefficient $\alpha$ to a value greater than or equal to −0.1 and smaller than or equal to 0.1, it becomes possible to effectively prevent the pattern matching process from failing. By setting the coefficient α to 0, it becomes possible to more effectively prevent the pattern matching process from failing.

In the second embodiment, in the case where the tentative local score is lower than the predetermined value (0), the tentative local score is multiplied by the coefficient α ($|α|<1$) to reduce the magnitude thereof thereby preventing the final score from becoming too high. Thus it is possible to prevent the number of matching candidate points from becoming too large. As a result, a reduction in calculation cost and a reduction in processing time are achieved, and an increase in the processing speed of the pattern matching process is achieved.

In step S44 described above, the local score is determined by calculating $α×f_k$. Alternatively, the local score may be set to 0 without performing the above-described calculation. In this case, the same effect is obtained as the effect obtained when $α=0$. Besides, the unnecessity of the calculation of $α×f_k$ allows a further reduction in calculation cost, a further reduction in processing time, and a further increase in the processing speed of the pattern matching process.

Third Embodiment

Figure 14:
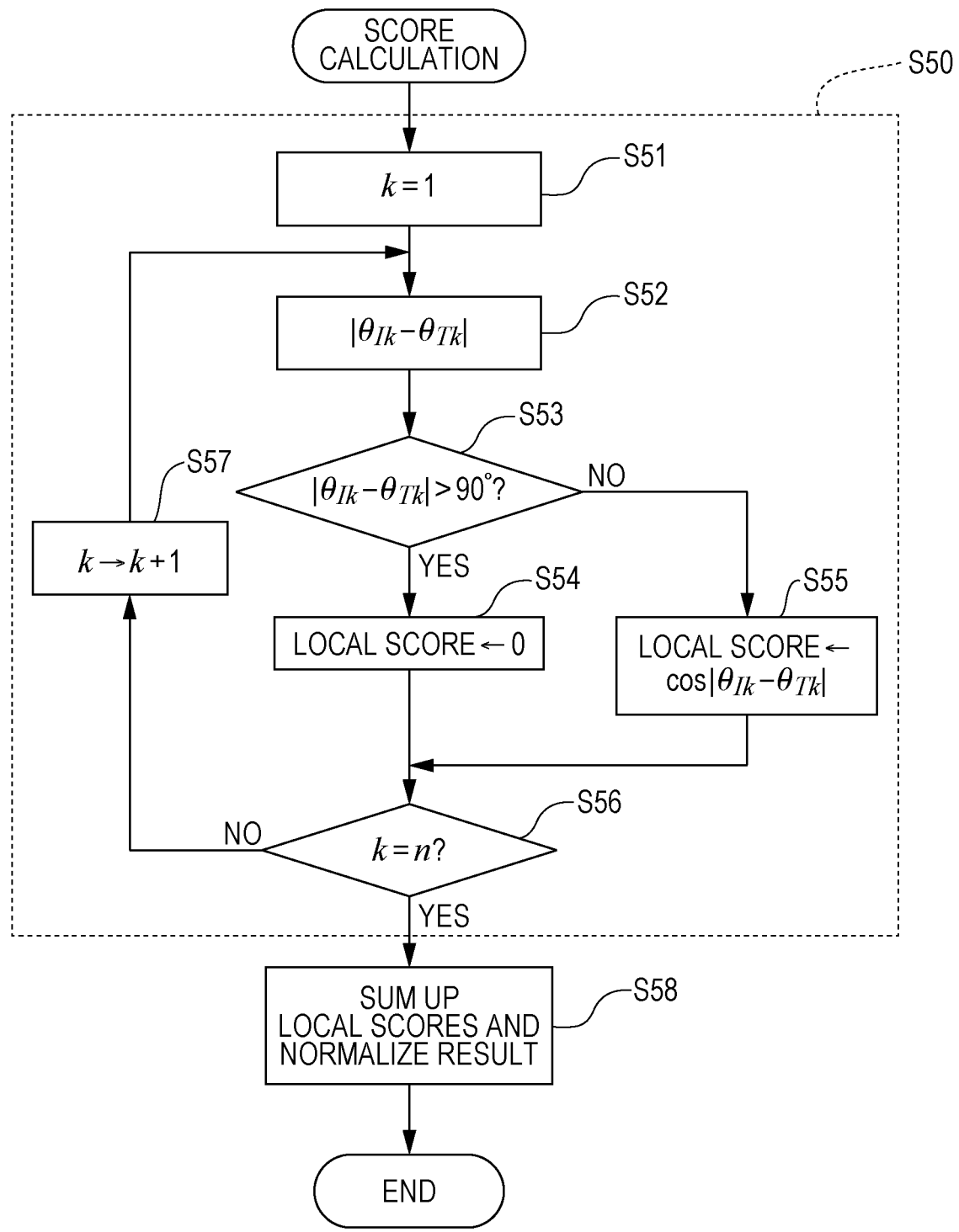
FIG. 14 is a flow chart illustrating a score calculation process in an image processing method according to a third embodiment.

Next, an image processing method executed by an image processing apparatus according to a third embodiment is described below. FIG. 14 is a flow chart illustrating a score calculation process (a similarity calculation process) in an image processing method performed by an image processing apparatus according to the third embodiment. In the following description of the third embodiment, a duplicated description of units or processes similar to those according to the first embodiment is omitted.

The image processing apparatus according to the third embodiment is configured in a similar manner to the image processing apparatus 300 according to the first embodiment described above. Furthermore, the image processing (the program 321) performed by the image processing apparatus according to the third embodiment is similar to that according to the first embodiment described above except for the score calculation process (FIG. 12). That is, the processes illustrated in FIG. 3, FIG. 8, FIG. 9, and FIG. 10 are similar for both the first and third embodiment.

In the first embodiment described above, the tentative local score (the tentative degree of local similarity) is evaluated by comparing it with a threshold value. In contrast, in the third embodiment, the local score (the degree of local similarity) is evaluated by comparing a parameter that occurs in the middle of the calculation of the local score (the degree of local similarity) with a threshold value.

First, the CPU 301 calculates the local score representing a degree of local similarity between an edge point in a feature image in a template image and a point, in a target object image, at a position corresponding to the edge point of the feature image for all points in the feature image in the template image (S50 (local similarity calculation process)). That is, the CPU 301 calculates the local score (the degree of local similarity) representing the degree of similarity between two pixels with the same coordinates one of which is located in the feature image in the template image and the other one of which is located in the image extracted from the target object image.

Thereafter, the CPU 301 determines a score (a degree of similarity) by summing up the local scores calculated in step S50 and normalizing the resultant value (S58 (similarity calculation process)). For example, in a case where the feature image in the template image includes n edge points (n pixels), the normalization is accomplished by dividing the sum of local scores by n.

A specific example of a method of calculating each local score in step S50 is described below.

First, the CPU 301 assigns serial numbers from 1 to n to edge points in the feature image in the template image, and sets the variable k to 1 to calculate the local score starting with the serial number of 1 (S51). The process in this step S51 is the same as the process in step S31 (FIG. 12) according to the first embodiment.

Next, the CPU 301 calculates an angle between an edge direction $θ_{Tk}$ at an edge point assigned a number k in the feature image in the template image and an edge direction $θ_{IK}$ at a point, in the target object image, at a position corresponding to the edge point assigned the number k in the feature image (S52). More specifically, the CPU 301 calculates $|θ_{IK}−θ_{Tk}|$.

Next, the CPU 301 determines whether the angle $|θ_{IK}−θ_{Tk}|$ is greater than a predetermined angle (90° in the third embodiment (S53).

In a case where the determination by the CPU 301 is that the angle $|θ_{IK}−θ_{Tk}|$ is greater than the predetermined angle (90°) (Yes in S53), the CPU 301 assigns the local score (degree of local similarity) a value whose absolute value is smaller than the cosine of the angle $|θ_{IK}−θ_{Tk}|$. More specifically, the CPU 301 sets the local score to be equal to 0.

On the other hand, in a case where the determination by the CPU 301 is that the angle $|θ_{IK}−θ_{Tk}|$ is smaller than or equal to the predetermined angle (90°), the CPU 301 calculates the cosine of the angle $|θ_{IK}−θ_{Tk}|$ and employs the result as the local score (S55). More specifically, the CPU 301 sets the local score to be equal to $\cos|θ_{IK}−θ_{Tk}|$.

The process in steps S56 and S57 is performed in a similar manner to the process in steps S36 and S37 (FIG. 12) according to the firsts embodiment described above, and thus a further detailed description thereof is omitted.

In the third embodiment, as described above, in step S54, a value whose absolute value is smaller than the cosine of the angle $|θ_{IK}−θ_{Tk}|$ is employed as the local score. This makes it possible to reduce an influence of adhesion of dust or dirt, a change in illumination, an object-to-object difference in surface state, or the like on the final score determined in step S58. In particular, in step S54, the local score is set to 0, and thus it is possible to more effectively reduce an influence of adhesion of dust or dirt, a change in illumination, an object-to-object difference in surface state, or the like on the final score.

As described above, the process in step S58 makes it possible to prevent the final score from becoming too small and thus it becomes possible to prevent the pattern matching process from failing.

Furthermore, in the third embodiment, the local score is evaluated in the middle of the calculation of the local score by using parameters $θ_{IK}$ and $θ_{Tk}$, and thus the calculation cost is low compared with the case where the tentative local score is calculated according to the first embodiment. In particular, in step S54, it is not necessary to perform the cosine calculation, which allows a reduction in the calculation cost compared with the first embodiment.

Thus, in the third embodiment, a further reduction in the calculation costs is achieved compared with the first embodiment, and it is possible to achieve a further reduction in processing time and a further increase in the processing speed of the pattern matching process.

Although in the example described above, the predetermined angle is set to 90°, an angle other than 90° may be used.

Fourth Embodiment

Figure 15:
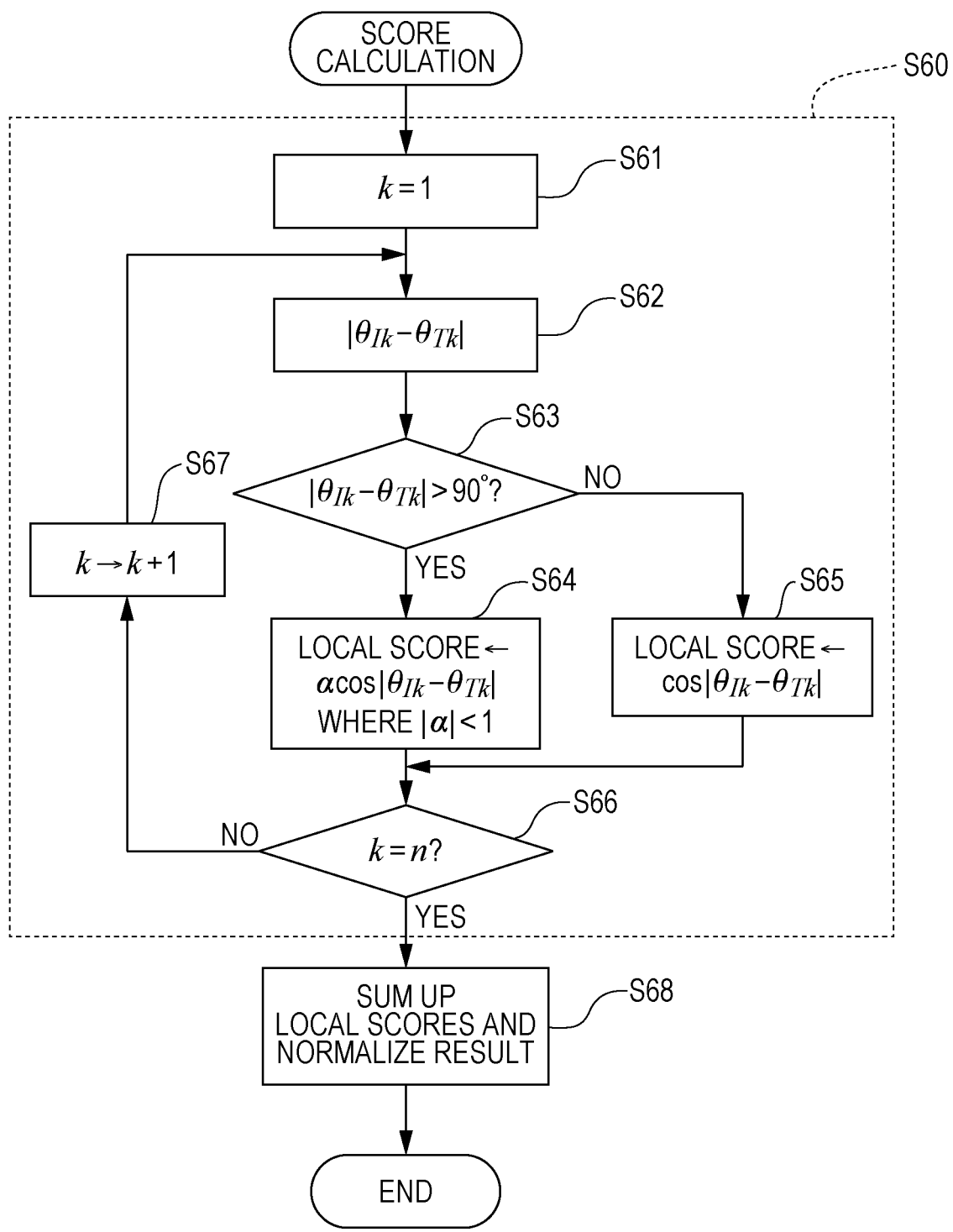
FIG. 15 is a flow chart illustrating a score calculation process in an image processing method according to a fourth embodiment.

Next, an image processing method executed by an image processing apparatus according to a fourth embodiment is described below. FIG. 15 is a flow chart illustrating the score calculation process (similarity calculation process) in the image processing method performed by the image processing apparatus according to the fourth embodiment. In the following description of the fourth embodiment, a duplicated description of units, parts, or processes similar to those according to the first or third embodiment is omitted.

The image processing apparatus according to the fourth embodiment is configured in a similar manner to the image processing apparatus 300 according to the first embodiment described above. Furthermore, the image processing (the program 321) performed by the image processing apparatus according to the fourth embodiment is similar manner to that according to the first embodiment described above except for the score calculation process (FIG. 12). That is, the processes illustrated in FIG. 3, FIG. 8, FIG. 9, and FIG. 10 are similar for both the first and third embodiment.

The score calculation process according to the fourth embodiment is a partial modification of the score calculation process according to the third embodiment described above. That is, although in the third embodiment described above, the local score is set to 0 in step S54 (FIG. 14), in the fourth embodiment, the local score is calculated.

First, the CPU 301 calculates a local score (a degree of local similarity) associated with an edge point in a feature image in a template image and a point, in a target object image, at a position corresponding to the edge point of the feature image for all points in the feature image in the template image (S60 (local similarity calculation process)). That is, the CPU 301 calculates the local score (the degree of local similarity) representing degree of similarity between two pixels which have the same coordinates and one of which is located in the feature image in the template image and the other one of which is located in the extracted image extracted from the target object image.

Thereafter, the CPU 301 determines a score (a degree of similarity) by summing up the local scores calculated in step S60 and normalizing the resultant value (S68 (similarity calculation process)). For example, in a case where the feature image in the template image includes n edge points (n pixels), the normalization is accomplished by dividing the sum of local scores by n.

A specific example of a method of calculating each local score in step S60 is described below. The process in steps S61 to S63 and S65 to S67 is performed in a similar manner to the process insteps S51 to S53 and S55 to S57 according to the third embodiment described above, and thus a further detailed description thereof is omitted.

In the fourth embodiment, in a case where the angle $|\theta_{IK}-\theta_{Tk}|$ is greater than a predetermined angle (90°) (Yes in S63), the CPU 301 determines the local score such that the cosine of the angle $|\theta_{IK}-\theta_{Tk}|$ is multiplied by a coefficient α whose absolute value is smaller than 1 and the result is employed as the local score (S64). More specifically, the CPU 301 calculates $\alpha \times |\theta_{IK}-\theta_{Tk}|$ as the value for the local score.

Thus it is possible to reduce an influence of adhesion of dust or dirt, a change in illumination, an object-to-object difference in surface state, or the like on the final score determined in step S68.

In particular, to change the local score to a value close to 0, it may be desirable that the coefficient α is set within a value greater than or equal to −0.1 and smaller than or equal to 0.1, and it is more desirable that the coefficient α is set to 0 to make is possible to change the local score to 0. Thus by setting the coefficient α to a value greater than or equal to −0.1 and smaller than or equal to 0.1, it is possible to reduce an influence of adhesion of dust or dirt, a change in illumination, an object-to-object difference in surface state, or the like on the final score. In particular, when the coefficient α is set to 0, then the local score becomes equal to 0, and thus it is possible to more effectively reduce an influence of adhesion of dust or dirt, a change in illumination, an object-to-object difference in surface state, or the like on the final score.

As described above, the process in step S68 makes it possible to prevent the final score from becoming too small and thus it becomes possible to prevent the pattern matching process from failing. In particular, by setting the coefficient α to a value greater than or equal to −0.1 and smaller than or equal to 0.1, it becomes possible to effectively prevent the pattern matching process from failing. By setting the coefficient α to 0, it becomes possible to more effectively prevent the pattern matching process from failing.

In the fourth embodiment, in a case where the angle is greater than the predetermined angle (90°), the value of the cosine of the angle is multiplied by the coefficient α ($|\alpha|<1$) thereby preventing the final score from becoming too high. Thus it is possible to prevent the number of matching candidate points from becoming too large. As a result, a reduction in calculation cost and a reduction in processing time are achieved, and an increase in the processing speed of the pattern matching process is achieved.

Fifth Embodiment

Figure 16:
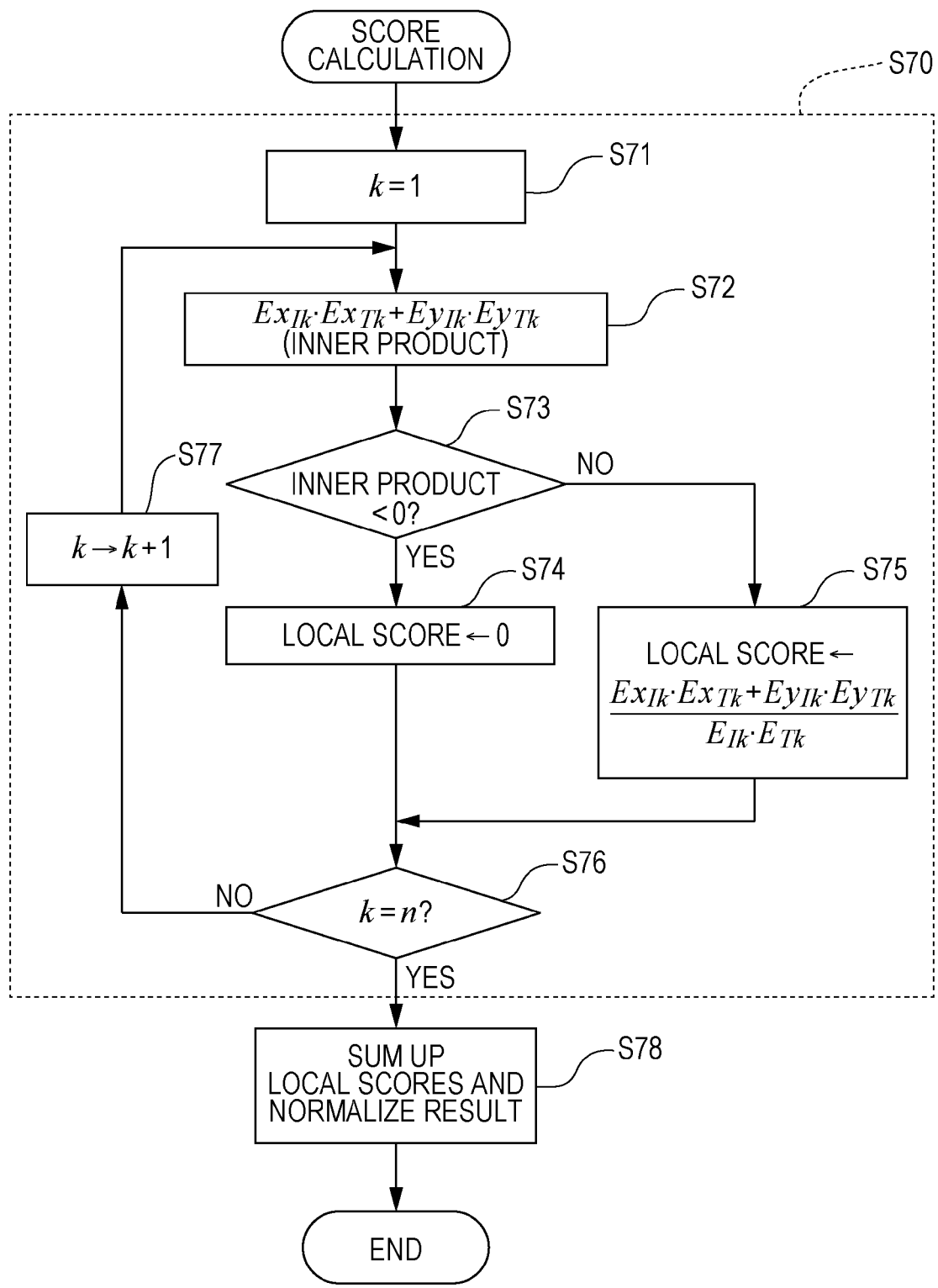
FIG. 16 is a flow chart illustrating a score calculation process in an image processing method according to a fifth embodiment.

Next, an image processing method executed by an image processing apparatus according to a fifth embodiment is described below. FIG. 16 is a flow chart illustrating the score calculation process (similarity calculation process) in the image processing method performed by the image processing apparatus according to the fifth embodiment. In the fifth embodiment, a duplicated description of units, parts, or processes similar to those according to the first or second embodiment is omitted.

The image processing apparatus according to the fifth embodiment is configured in a similar manner to the image processing apparatus 300 according to the first or second embodiment described above. The image processing (the program 321) performed by the image processing apparatus according to the fifth embodiment is similar to that according to the first embodiment described above except for the score calculation process (FIG. 12). That is, the processes illustrated in FIG. 3, FIG. 8, FIG. 9, and FIG. 10 are similar for both the first and third embodiment.

In the second embodiment described above, the tentative local score (tentative degree of local similarity) is evaluated by comparing it with a threshold value. In contrast, in the fifth embodiment, the local score (the degree of local similarity) is evaluated by comparing a parameter that occurs in the middle of the calculation of the local score (the degree of local similarity) with a threshold value.

First, the CPU 301 calculates a local score (a degree of local similarity) associated with an edge point in a feature image in a template image and a point, in a target object image, at a position corresponding to the edge point of the feature image for all points in the feature image in the template image (S70 (local similarity calculation process)). That is, the CPU 301 calculates the local score (the degree of local similarity) representing degree of similarity between two pixels which have the same coordinates and one of which is located in the feature image in the template image and the other one of which is located in the extracted image extracted from the target object image.

Thereafter, the CPU 301 determines a score (degree of similarity) by summing up the local scores calculated in step S70 and normalizing the resultant value (S78 (similarity calculation process)). For example, in a case where the feature image in the template image includes n edge points (n pixels), the normalization is accomplished by dividing the sum of local scores by n.

A specific example of a method of calculating each local score in step S70 is described below.

First, the CPU 301 assigns serial numbers from 1 to n to edge points in the feature image in the template image, and sets the variable k to 1 to calculate the local score starting with the serial number of 1 (S71). The process in this step S71 is the same as the process in step S31 (FIG. 12) according to the first embodiment.

Herein, a vector (a first vector) representing the edge strength at an edge point (a pixel) having a serial number k in the feature image is denoted as ($Ex_{Tk}$, $Ey_{Tk}$). Furthermore, a vector (a second vector) representing the edge strength at a point (pixel), in the target object image, at a position corresponding to the edge point in the feature image, that is, at the same coordinates as the coordinates of the edge point assigned a serial number k is denoted as ($Ex_{IK}$, $Ey_{IK}$). The magnitudes of the first vector is denoted as $E_{Tk}$, and the magnitudes of the second vector is denoted as $E_{IK}$.

First, the CPU 301 calculates the inner product between the first vector ($Ex_{Tk}$, $Ey_{Tk}$) and the second vector ($Ex_{IK}$, $Ey_{IK}$) (S72). More specifically, the CPU 301 calculates $Ex_{IK} \cdot Ex_{Tk} + Ey_{IK} \cdot Ey_{Tk}$.

Next, the CPU 301 determines whether the inner product $Ex_{IK} \cdot Ex_{Tk} + Ey_{IK} \cdot Ey_{Tk}$ is smaller than a predetermined value (0)(S73).

In a case where the determination by the CPU 301 is that the inner product is smaller than the predetermined value (0), the CPU 301 sets the local score to be equal to a value whose absolute value is smaller than the inner product divided by the product of the magnitude $E_{Tk}$ of the first vector and the magnitude $E_{IK}$ of the second vector (S74). More specifically, the CPU 301 sets the local score to be equal to 0.

In a case where the determination by the CPU 301 is that the inner product is greater than or equal to the predetermined value (0), (No in S73), the CPU 301 calculates the local score such that the inner product is divided by the product of the magnitude $E_{IK}$ of the first vector and the magnitude $E_{IK}$ of the second vector and the result is employed as the local score (S75). More specifically, the CPU 301 sets the local score to be equal to ($Ex_{IK} \cdot Ex_{Tk} + Ey_{IK} \cdot Ey_{Tk}$)/($E_{IK} \cdot E_{Tk}$).

The process in steps S76 and S77 is performed in a similar manner to the process in steps S36 and S37 (FIG. 12) according to the first embodiment described above and to the process in steps S46 and S47 according to the second embodiment described above and thus a further detailed description thereof is omitted.

As described above, in the fifth embodiment, in step S74, the local score is set to be equal to a value whose absolute value is smaller than ($Ex_{IK} \cdot Ex_{Tk} + Ey_{IK} \cdot Ey_{Tk}$)/($E_{IK} \cdot E_{Tk}$). This makes it possible to reduce an influence of adhesion of dust or dirt, a change in illumination, an object-to-object difference in surface state, or the like on the final score determined in step S78. In particular, in step S74, the local score is set to 0, and thus it is possible to more effectively reduce an influence of adhesion of dust or dirt, a change in illumination, an object-to-object difference in surface state, or the like on the final score.

As described above, the process in step S78 makes it possible to prevent the final score from becoming too small and thus it becomes possible to prevent the pattern matching process from failing.

Furthermore, as described above, in the fifth embodiment, the local score is evaluated in the middle of the calculation of the local score by evaluating a parameters $Ex_{Tk}$, $Ey_{Tk}$, $Ex_{IK}$, and $Ey_{IK}$ with respect to a threshold value, and thus the calculation cost is lower than the case where the tentative local score is calculated. In particular, in step S74, it is not necessary to perform a calculation, which allows a reduction in the calculation cost compared with the second embodiment.

Thus, in the fifth embodiment, a further reduction in the calculation costs is achieved compared with the second embodiment, and it is possible to achieve a further reduction in processing time, a further increase in the processing speed of the pattern matching process.

Although in the example described above, the predetermined value is set to 0, a value other than 0 may be used.

Sixth Embodiment

Figure 17:
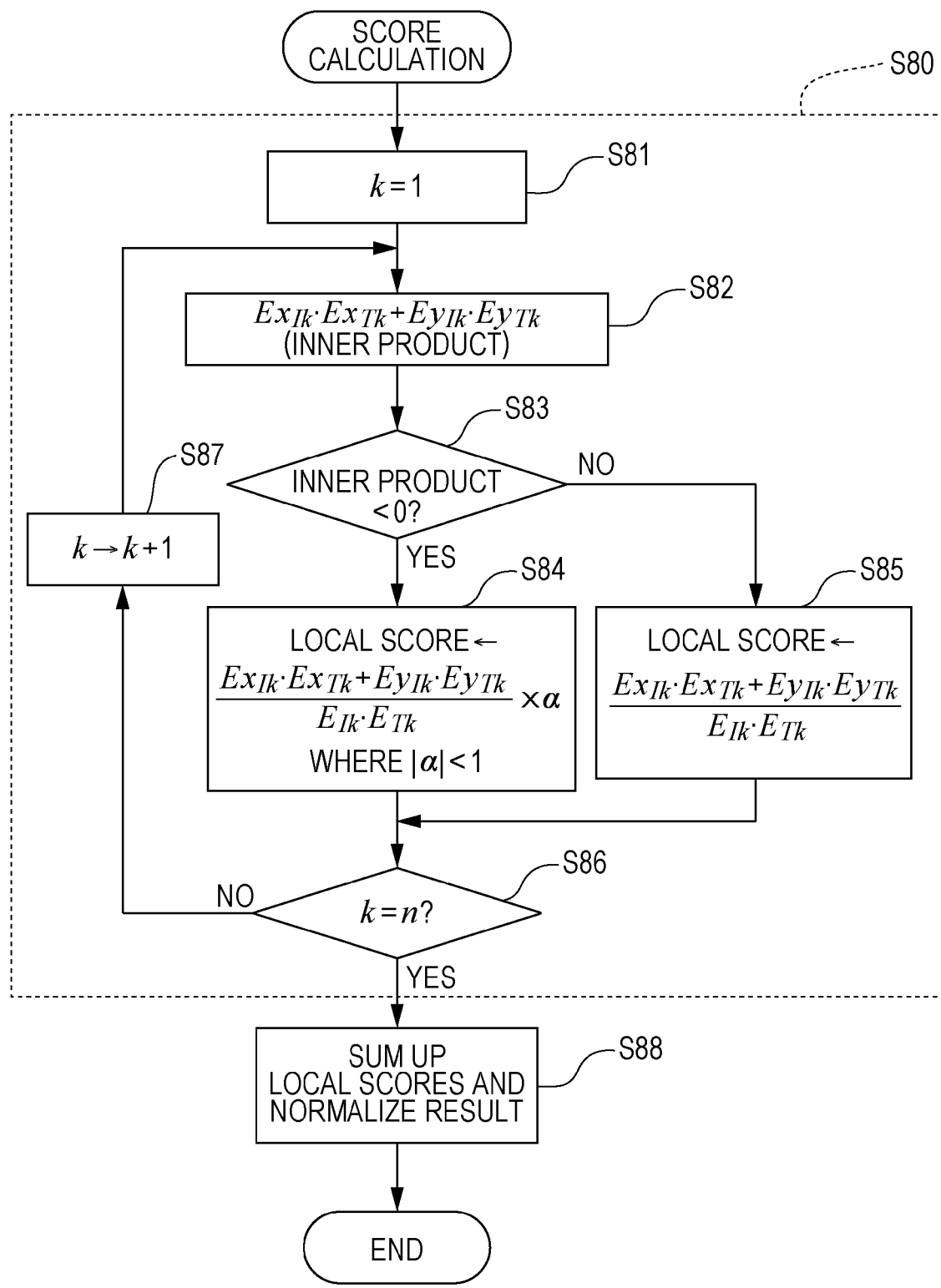
FIG. 17 is a flow chart illustrating a score calculation process in an image processing method according to a sixth embodiment.

Next, an image processing method executed by an image processing apparatus according to a sixth embodiment is described below. FIG. 17 is a flow chart illustrating the score calculation process (similarity calculation process) in the image processing method performed by the image processing apparatus according to the sixth embodiment. In the sixth embodiment, a duplicated description of units, parts, or processes similar to those according to the first, second, or third embodiment is omitted.

The image processing apparatus according to the sixth embodiment is configured in a similar manner to the image processing apparatus 300 according to the first embodiment described above. The image processing (the program 321) performed by the image processing apparatus according to the sixth embodiment is similar to that according to the first embodiment described above except for the score calculation process (FIG. 12). That is, the processes illustrated in FIG. 3, FIG. 8, FIG. 9, and FIG. 10 are similar for both the first and third embodiment.

The score calculation process according to the sixth embodiment is a partial modification of the score calculation process according to the fifth embodiment described above. That is, although in the fifth embodiment described above, the local score is set to 0 in step S74 (FIG. 14), in the sixth embodiment, the local score is calculated.

First, the CPU 301 calculates a local score (a degree of local similarity) associated with an edge point in a feature image in a template image and a point, in a target object image, at a position corresponding to the edge point of the feature image for all points in the feature image in the template image (S80 (local similarity calculation process)). That is, the CPU 301 calculates the local score (the degree of local similarity) representing degree of similarity between two pixels having the same coordinates one of which is located in the feature image in the template image and the other one of which is located in the extracted image extracted from the target object image.

The CPU 301 determines the score (degree of similarity) by summing up the local scores calculated in step S80 and normalizing the resultant value (S88 (similarity calculation process)). For example, in a case where the feature image in the template image includes n edge points (n pixels), the normalization is accomplished by dividing the sum of local scores by n.

A specific example of a method of calculating each local score in step S80 is described below. The process in steps S81 to S83 and S85 to S87 is performed in a similar manner to the process in steps S71 to S73 and S75 to S77 according to the fifth embodiment described above, and thus a further detailed description thereof is omitted.

In the sixth embodiment, in a case where the inner product is smaller than the predetermined value (0) (Yes in S83), the CPU 301 determines the local score such that the inner product is divided by the product of $E_{Tk}$ and $E_{IK}$ and further multiplied by a coefficient α whose absolute value is smaller than 1, and the result is employed as the local score (degree of local similarity) (S84). More specifically, the CPU 301 calculates $(Ex_{IK} \cdot Ex_{Tk} + Ey_{IK} \cdot Ey_{Tk})/(E_{IK} \cdot E_{Tk}) \times \alpha$ and employs the result as the local score.

Thus it is possible to reduce an influence of adhesion of dust or dirt, a change in illumination, an object-to-object difference in surface state, or the like on the final score determined in step S88.

In particular, to change the local score to a value close to 0, it may be desirable that the coefficient α is set within a range from −0.1 to 0.1 and it is more desirable that the coefficient α is set to 0 to make is possible to change the local score to 0. Thus by setting the coefficient α to a value greater than or equal to −0.1 and smaller than or equal to 0.1, it is possible to reduce an influence of adhesion of dust or dirt, a change in illumination, an object-to-object difference in surface state, or the like on the final score. In particular, when the coefficient α is set to 0, then the local score becomes equal to 0, and thus it is possible to more effectively reduce an influence of adhesion of dust or dirt, a change in illumination, an object-to-object difference in surface state, or the like on the final score.

As described above, the process in step S88 makes it possible to prevent the final score from becoming too small and thus it becomes possible to prevent the pattern matching process from failing. In particular, by setting the coefficient α to a value greater than or equal to −0.1 and smaller than or equal to 0.1, it becomes possible to effectively prevent the pattern matching process from failing. By setting the coefficient α to 0, it becomes possible to more effectively prevent the pattern matching process from failing.

In the sixth embodiment, in a case where the inner product is smaller than the predetermined value (0), the inner product is divided by the product $E_{IK} \cdot E_{Tk}$ and further is multiplied by the coefficient α (|α|<1) thereby preventing the final score from becoming too high. Thus it is possible to prevent the number of matching candidate points from becoming too large. As a result, a reduction in calculation cost and a reduction in processing time are achieved, and an increase in the processing speed of the pattern matching process is achieved.

Seventh Embodiment

Figure 18:
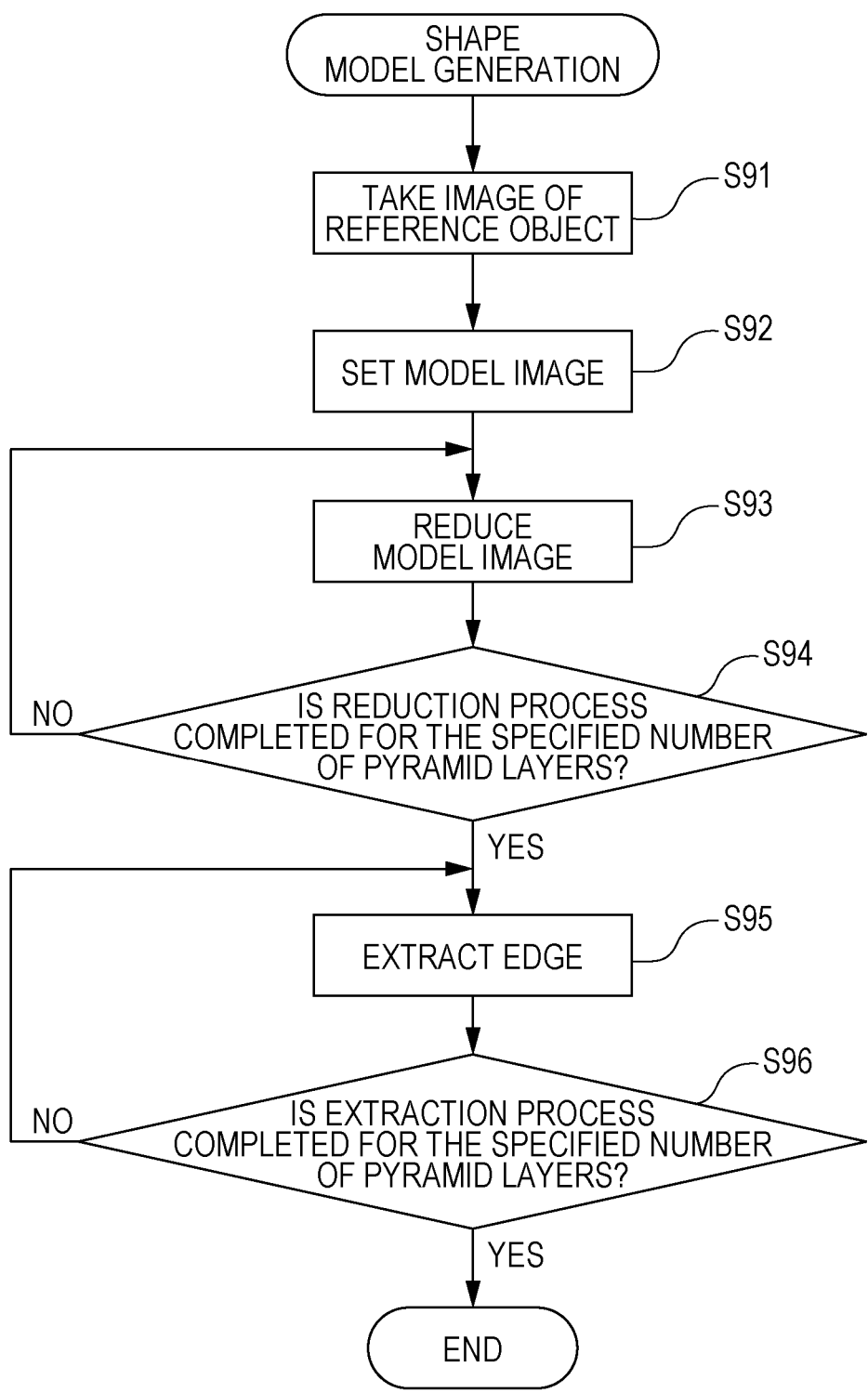
FIG. 18 is a flow chart illustrating a method of generating a first pyramid in an image processing method according to a seventh embodiment.

Next, an image processing method executed by an image processing apparatus according to a seventh embodiment is described below. FIG. 18 is a flow chart illustrating the method of generating the first pyramid (the shape model) in the image processing method executed by the image processing apparatus according to the seventh embodiment. FIG. 19 is a flow chart illustrating the searching process in the image processing method performed by the image processing apparatus according to the seventh embodiment. In the seventh embodiment, a duplicated description of units, parts, or processes similar to those according to one of first to sixth embodiments is omitted.

The image processing apparatus according to the seventh embodiment is configured in a similar manner to the image processing apparatus 300 according to the first embodiment described above. In the seventh embodiment, the first and second pyramids are generated in a different manner from the first embodiment described above. The following description will focus on differences from the first embodiment.

The process in steps S91 and S92 illustrated in FIG. 18, that is, the process of setting a model image from a reference image, is performed in a similar manner to steps S1 and S2 illustrated in FIG. 3.

Next, the CPU 301 reduces the model image set in step S92 as many times as there are pyramid layers specified by a user (S93 and S94).

The reduction of the image is accomplished by generating one pixel of the reduced image from 2×2 pixels of the model image sequentially starting with 2×2 pixels in the upper left corner of the model image as illustrated in FIG. 6. More specifically, the intensity of one pixel of the reduced image is given by the average value of luminance values of four pixels, that is, 2×2 pixels of the image to be reduced. The CPU 301 performs the reduction process using the average value on the image to be reduced repeatedly until all pixels are processed thereby generating a reduced image with a width and a height one-half those of the original image (S93).

By performing the image reduction process described above repeated as illustrated in FIG. 7, a reduced image of the model image is generated. In a case where the number of pyramid layers is specified as, for example, 4 by an operator, an image with no reduction and three reduced images are generated such that the images are reduced stepwisely from one layer to another.

Next, the CPU 301 performs an edge extraction process on all model images generated in steps S93 and S94 (S95, S96). The edge extraction is performed in a similar manner to the first embodiment. As a result, feature images reduced stepwisely are obtained. The first pyramid (the shape model) is thus formed as a set of all feature images including reduced feature images generated in steps S91 to S96.

That is, the CPU 301 generates a plurality of images having different resolutions, including a captured image obtained by taking an image of a reference object and one or more reduced images obtained by performing the reduction process on the captured image. The CPU 301 then performs an edge extraction process on the plurality of images having different resolution to generate a plurality of template images so as to form a first pyramid.

Next, a flow of a searching process to actually detect an object using the first pyramid (the shape model) generated in the above-described manner is described with reference to a flow chart illustrated in FIG. 19.

The process in steps S101 and S102 in FIG. 19, that is, the process of inputting a shape model and taking an image of a target object, is similar to the process in steps S6 and S7 in FIG. 8.

Next, the CPU 301 performs an image reduction process on the input captured image as many times as needed to form the pyramid layers. (S103, S104). The image reduction method is similar to that used in steps S93 and S94 in FIG. 18. By this process of reducing the captured image, a plurality of images with stepwise reduction ratios are generated.

Next, the CPU 301 performs the edge extraction process on all images generated in steps S103 and S104 (S105, S106). The edge extraction method is similar to that according to the first embodiment. As a result, a plurality of target object images with stepwise reduction ratios are generated.

That is, the CPU 301 generates a plurality of images having different resolutions, including a captured image obtained by taking an image of a target object and one or more reduced images obtained by performing a reduction process. Next, the CPU 301 performs an edge extraction process on the plurality of generated images having different resolutions thereby generating a plurality of target object images so as to form a second pyramid.

The CPU 301 performs pattern matching between the feature images of the template images including in the first pyramid generated in the model generation process and the target object images generated in steps S105 and S106 (S107). The method of the pattern matching is similar to that according to the first embodiment described above with reference to FIGS. 9 and 10. The score calculation in steps S13 and S19 in FIG. 9 and FIG. 10 may be performed using one of methods described above with reference to FIGS. 12 to 17.

The seventh embodiment also provides advantageous effects similar to those achieved by the first to sixth embodiments described above.

Note the present invention is not limited to the embodiments described above, but various modifications are possible without departing from the spirit and the scope of the invention.

The respective processing operations according to any embodiment described above are executed by the CPU 301. A program for realizing one or more functions described may be stored in a storage medium, and the storage medium may be supplied to the image processing apparatus 300. A computer (a CPU, an MPU, or the like) of the image processing apparatus 300 may be read out the program from the storage medium and may execute the program thereby realizing the functions described above. In this case, the program read from the storage medium implements the functions disclosed in the embodiments described above, and thus the program and the storage medium in which the program is stored both fall within the scope of the present invention.

In the embodiments described above, the HDD 304 may be used as the computer-readable storage medium, and the program 321 may be stored in the HDD 304 although the computer-readable medium is not limited to the HDD 304. The program may be stored in any storage medium as long as the storage medium allows a computer to read the program from the storage medium. As for the storage medium for supplying the program, for example, the ROM 302, the storage disk 322, the external storage apparatus 800, illustrated in FIG. 2, or the like, may be used. Specific examples of storage media include a flexible disk, a hard disk, an optical disk, a magneto-optical disk, a CD-ROM disk, a CD-R disk, a magnetic tape, a rewritable nonvolatile memory (for example, a USB memory), a ROM, or the like.

The program according to one of the embodiments described above may be downloaded to a computer via a network, and the computer may execute the downloaded program.

The functions disclosed in the embodiments may be implemented not only by executing the program code on a computer, but part or all of the process may be performed by an operating system or the like running on the computer in accordance with the program code. Such implementation of the functions also falls within the scope of the present invention.

To implement one or more functions according to any of the above-described embodiments of the invention, the program stored on a storage medium may be loaded into a memory of an extension card inserted in a computer or into a memory of an extension unit connected to the computer, and part or all of the process may be performed by a CPU or the like disposed on the extension card or the extension unit in accordance with the loaded program code. Note that such implementation of the functions also falls within the scope of the present invention.

In the embodiments described above, the processes are performed such that the computer is executes the program stored in the storage medium such as the HDD or the like. However, the manner of performing the processes is not limited to that described in the embodiments described above. For example, part or all of functions realized by an operation unit that operates based on the program may be realized using a dedicated large scale integration (LSI) such as an application specific integrated circuit (ASIC), a field programmable gate array (FPGA), or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-141277, filed Jul. 9, 2014, which is hereby incorporated by reference herein in its entirety.

What is claimed is:

1. An image processing method for searching for a position of a pattern included in a model image in a search target by using a plurality of template images and a pyramid, the plurality of template images being hierarchized sequentially by performing reduction processing and low resolution processing on a feature image of the model image, the pyramid being obtained by search target image hierarchization in accordance with reduction and resolution of the template images, the method comprising:

calculation of a degree of similarity being performed between the plurality of template images and the search target image, the calculation being performed sequentially in an ascending order of resolution from low to high, the calculation being performed through procedure comprising:

a local degree of similarity calculation process of calculating local degree of similarity between a point of the feature image of the model image and a point corresponding to the point of the feature image in the search target image for each range corresponding to the feature image of the model image while shifting a position of the feature image of the model image on the search target image; and a degree of similarity calculation process of calculating degree of similarity for each range corresponding to the feature image of the image model at each position of said each local degree of similarity, wherein correction is performed to decrease an absolute value of the local degree of similarity in a case where the local degree of similarity is less than a predetermined value in the local degree of similarity calculation process.

2. The image processing method according to claim 1, wherein in a case where the tentative degree of local similarity is smaller than the predetermined value, the tentative degree of local similarity is multiplied by a coefficient with an absolute value smaller than 1.

3. The image processing method according to claim 2, wherein the coefficient is greater than or equal to −0.1 and smaller than or equal to 0.1.

4. The image processing method according to claim 2, the coefficient is equal to 0.

5. The image processing method according to claim 1, the predetermined value is equal to 0.

6. The image processing method according to claim 1, wherein
the feature image includes a set of edge points extracted via an edge extraction process,
the target object image is an image including a set of edge points extracted via the edge extraction process, and
the tentative degree of local similarity is determined by calculating the cosine of an angle between an edge direction at an edge point in the feature image and an edge direction in the target object image at a point at a position corresponding to the edge point in the feature image.

7. The image processing method according to claim 1, wherein
the feature image is a set of edge points extracted via an edge extraction process,
the target object image is an image including a set of edge points extracted via the edge extraction process,
an edge strength at each edge point is represented by a vector, and
the tentative degree of local similarity is determined by calculating the inner product between a first vector representing the edge strength at an edge point in the feature image and a second vector representing the edge strength at a point in the target object image at a position corresponding to the edge point in the feature image and then dividing the inner product by the product of the magnitude of the first vector and the magnitude of the second vector.

8. The image processing method according to claim 1, wherein:
the feature image includes edge points extracted by performing an edge extraction process on the model image, and the pyramid includes edge points extracted by performing edge extraction process on the search target image,
the local degree of similarity calculation process includes calculating a value of cosine of a difference in angle between an edge direction at each edge point in the feature image and an edge direction at a point corresponding to the edge point in the feature image in the search target image; and
the correction is performed to decrease an absolute of the cosine in a case where the cosine is greater than a predetermined value.

9. The image processing method according to claim 8, wherein the predetermined angle is equal to 90°.

10. The image processing method according to claim 8, wherein in the calculating the degree of local similarity, in a case where the angle is greater than the predetermined angle, the degree of local similarity is set to be equal to 0.

11. The image processing method according to claim 8, wherein the calculating the degree of local similarity including in a case where the angle is greater than the predetermined angle, the degree of local similarity is calculated by multiplying the cosine of the angle by a coefficient whose absolute value is smaller than 1.

12. The image processing method according to claim 11, wherein the coefficient is greater than or equal to −0.1 and smaller than or equal to 0.1.

13. The image processing method according to claim 11, wherein the coefficient is equal to 0.

14. The image processing method according to claim 1, wherein the plurality of template images in the first pyramid include an image obtained by performing an edge extraction process on a captured image obtained by taking an image of a reference object and a reduced image obtained by performing a reduction process on the image.

15. The image processing method according to claim 1, wherein the plurality of template images in the first pyramid are generated by forming a plurality of images having different resolutions including a captured image obtained by taking an image of a reference object and one or more reduced images obtained by reducing the captured image and then performing an edge extraction process on the plurality of images.

16. The image processing method according to claim 1, wherein the plurality of target object images in the second pyramid include an image obtained by performing an edge extraction process on a captured image obtained by taking an image of a target object, and a reduced image obtained by performing a reduction process on the image.

17. The image processing method according to claim 1, wherein the plurality of target object images in the second pyramid are generated by forming a plurality of images having different resolutions including a captured image obtained by taking an image of a target object and one or more reduced images obtained by reducing the captured image and then performing an edge extraction process on the plurality of images.

18. A non-transitory computer-readable storage medium storing a program configured to cause a computer to execute one or more processes of the imaging processing method according to claim 1.

19. A method of producing an assembly, comprising:
preparing model image of a target object;
capturing an image of the target object;
executing the image processing method according to claim 1 to acquire a position of the target object in the captured image, the model image being a model image of the target object, and the search target image being the captured image; and
assembling the target object with a receiving member.

20. An image processing method for performing image processing by an image processing apparatus using a first pyramid including a plurality of template images having different resolutions and hierarchized in layers according to the resolutions, a second pyramid including a plurality of target object image having different resolutions from each other but equal to the respective resolutions of the template images in the first pyramid and hierarchized in layers according to the resolutions such that an image similar to a feature image included in a template image in the first pyramid is searched for from a target object image in the second pyramid by evaluating similarity between images in corresponding layers on a layer-to-layer basis in the order of resolution from the lowest to highest, the feature image being a set of edge points extracted via an edge extraction process, the target object image being an image including a set of edge points extracted via the edge extraction process, an edge strength at each edge point being represented by a vector, the method comprising:

calculating a degree of local similarity between a point in the feature image and a corresponding point in the target object on a point-by-point basis for each of all points in the feature image; and calculating the degree of the similarity between the feature image and the target object image by determining the sum of the calculated degrees of local similarity and normalizing the sum, the calculating the degree of local similarity including calculating the inner product between a first vector representing the edge strength at an edge point in the feature image and a second vector representing the edge strength at a point, in the target object image, at a position corresponding to the edge point in the feature image, and in a case where inner product is greater than or equal to a predetermined value, calculating the degree of local similarity by dividing the inner product by the product of the magnitude of the first vector and the magnitude of the second vector, while in a case where inner product is smaller than the predetermined value, setting the degree of local similarity to be equal to a value whose absolute value is smaller than the value obtained by dividing the inner product by the product of the magnitude of the first vector and the magnitude of the second vector.

21. The image processing method according to claim 20, wherein the predetermined value is equal to 0.

22. The image processing method according to claim 20, wherein in the calculating the degree of local similarity, in a case where the inner product is smaller than the predetermined value, the degree of local similarity is set to be equal to 0.

23. The image processing method according to claim 20, wherein in the calculating the degree of local similarity, in a case where the inner product is smaller than the predetermined value, the degree of local similarity is calculated by dividing the inner product by the product of the magnitude of the first vector and the magnitude of the second vector and further multiplying the result by a coefficient whose absolute value is smaller than 1.

24. The image processing method according to claim 23, wherein the coefficient is greater than or equal to −0.1 and smaller than or equal to 0.1.

25. The image processing method according to claim 23, wherein the coefficient is equal to 0.

26. An image processing apparatus comprising:

an image acquiring unit configured to acquire a captured image; and a processor configured to search for a position of a pattern included in a model image the acquired captured image wherein the processor searches the position of the pattern using a plurality of template images and a pyramid, the plurality of template images being hierarchized sequentially by performing reduction processing and low resolution processing on a feature image of the model image, the pyramid being obtained hierarchization of the captured image in accordance with reduction and resolution of the template images by calculation of a degree of similarity being performed by the processor between the plurality of template images and a search target image generated from the captured image, the calculation being performed sequentially in an ascending order of resolution from low to high, the calculation being performed through procedure comprising:

generating the search target image via an edge extraction process of the captured image;

calculating local degree of similarity between a point of the feature image of the model image and a point corresponding to the point of the feature image in the search target image for each range corresponding to the feature image of the model image while shifting a position of the feature image of the model image on the search target image; and calculating degree of similarity for each range corresponding the feature image of the model image at each position on the basis of said local degree of similarity;

wherein correction is performed to decrease an absolute value of the local degree of similarity in a case where the local degree of similarity is less than a predetermined value in the local degree of similarity calculation process.

27. A production apparatus comprising:

a robot;

the image processing apparatus according to claim 26; and a robot control apparatus configured to control the robot based on a result of an image processing performed by the image processing apparatus.

* * * * *